(12) United States Patent
Magoz

(10) Patent No.: US 11,234,307 B2
(45) Date of Patent: *Jan. 25, 2022

(54) PULSED DRIVER FOR A DIODE LIGHT SOURCE

(71) Applicant: Facebook Technologies, LLC, Menlo Park, CA (US)

(72) Inventor: Ziv Magoz, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/907,054

(22) Filed: Jun. 19, 2020

(65) Prior Publication Data

US 2020/0359480 A1     Nov. 12, 2020

Related U.S. Application Data

(63) Continuation of application No. 16/409,037, filed on May 10, 2019, now Pat. No. 10,728,984.

(51) Int. Cl.
*H05B 45/37* (2020.01)
*G06F 1/10* (2006.01)
(Continued)

(52) U.S. Cl.
CPC ............... *H05B 45/37* (2020.01); *G06F 1/10* (2013.01); *H05B 45/00* (2020.01); *H05B 47/16* (2020.01)

(58) Field of Classification Search
CPC ............... H01S 5/02469; H01S 5/0085; H01S 5/02212; H01S 5/12; H01S 5/0021; H01S 5/005; H01S 5/02236; H01S 5/02276; H01S 5/026; H01S 5/0612; H01S 5/06216; H01S 5/0622; H01S 5/22; H01S 5/227; H01S 5/34333; H01S 5/0217; H01S 5/02284; H01S 5/02296; H01S 5/4012; H01S 5/4031; H01S 3/109; H01S 5/0092; H01S 5/0202; H01S 5/0215; H01S 5/02248; H01S 5/02252; H01S 5/02268; H01S 5/02292; H01S 5/0286; H01S 5/0287; H01S 5/14; H01S 5/183; H01S 5/2201; H01S 5/3202; H01S 5/423; H01S 5/5018; H01S 5/5036; H01S 5/5081; H01S 5/0071; H01S 5/0203; H01S 5/0216; H01S 5/02216; H01S 5/02438; H01S 5/0265; H01S 5/0425; H01S 5/1039; H01S 5/1096; H01S 5/2009; H01S 5/32; H01S 5/3203; H01S 5/32341;
(Continued)

(56) References Cited

U.S. PATENT DOCUMENTS 10,728,984 B1 * 7/2020 Magoz .................. H05B 47/16
2015/0054410 A1 * 2/2015 Sanders ................ H05B 45/28
315/151
(Continued)

*Primary Examiner* — Monica C King
(74) *Attorney, Agent, or Firm* — Pequignot + Myers; Matthew A. Pequignot

(57) ABSTRACT

A powering circuit for a diode light source includes an inductor charged through an on/off switch. The charging occurs during a charging cycle for a controllable amount of time when the on/off switch is closed. The energy of the charged inductor is used to power the semiconductor light source by opening the on/off switch. In such a driving configuration, the ringing is nearly constant and thus may be suppressed using an appropriately configured circuit.

20 Claims, 18 Drawing Sheets

(51) Int. Cl.
*H05B 45/00* (2020.01)
*H05B 47/16* (2020.01)

(58) Field of Classification Search
CPC ........ H01S 4/40; H01S 5/4025; H01S 5/4056; H01S 5/4093; H01S 5/50; H01S 5/5045; H01S 5/5072; H05B 33/0803; H05B 33/0818; H05B 33/0842; H05B 33/0857; H05B 33/0866; H05B 33/0893; H05B 37/03; H05B 45/00; H05B 45/37; H05B 45/38; H05B 47/16; G06F 3/013; G06F 1/163; G06F 3/017; G06F 3/005; G06F 3/011; G06F 3/012; G06F 3/03547; G06F 3/04815; G06F 13/00; G06F 3/014; G06F 3/0227; G06F 3/0346; G06F 3/0488; G06F 3/167; G06F 2203/0331; G06F 2203/0338; G06F 3/016; G06F 3/0304; G06F 3/0428; G06F 1/10; G06F 21/32; G06F 3/0233; G06F 3/0236; G06F 3/04842; G06F 3/14; G06F 3/165; G02B 27/017; G02B 2027/0178; G02B 27/0093; G02B 2027/014; G02B 2027/0187; G02B 2027/0118; G02B 27/0172; G02B 2027/0138; G02B 5/30; G02B 27/0176; G02B 2027/0127; G02B 2027/0132; G02B 27/0149; G02B 2027/0112; G02B 2027/0123; G02B 2027/0147; G02B 5/18; G02B 6/12009; G02B 6/12019; G02B 2027/011; G02B 2027/0134; G02B 2207/113; G02B 2207/115; G02B 5/04; G02B 5/1842; G02B 5/23; G02B 5/28; G02B 5/3058; G02B 6/0038; G02B 6/0045; G02B 6/0053; G02B 6/0056; G02B 7/008; H01L 2924/00; H01L 2924/00014; H01L 2224/45144; H01L 2224/45015; H01L 2224/48624; H01L 2924/01006; H01L 2924/01047; H01L 2924/12032; H01L 2924/12042; H01L 2924/12043; H01L 2924/1306; H01L 2924/0002; H01L 2924/20752; H01L 2224/43; H01L 2224/45139; H01L 27/14806; H01L 2924/013; H01L 51/5012; H01L 2224/05624; H01L 2224/45164; H01L 2224/45169; H01L 2224/45173; H01L 2224/45178; H01L 23/4952; H01L 24/45; H01L 24/48; H01L 2924/01005; H01L 2924/01007; H01L 2924/01011; H01L 2924/01012; H01L 2924/01014; H01L 2924/01015; H01L 2924/01016; H01L 2924/01019; H01L 2924/0102; H01L 2924/01022; H01L 2924/01023; H01L 2924/01027; H01L 2924/01028; H01L 2924/01029; H01L 2924/0103; H01L 2924/01031; H01L 2924/01033; H01L 2924/01038; H01L 2924/0104; H01L 2924/01042; H01L 2924/01044; H01L 2924/01045; H01L 2924/01046; H01L 2924/01049; H01L 2924/0105; H01L 2924/01051; H01L 2924/01052; H01L 2924/01056; H01L 2924/01058; H01L 2924/01063; H01L 2924/01072; H01L 2924/01073; H01L 2924/01074; H01L 2924/01075; H01L 2924/01076; H01L 2924/01077; H01L 2924/01078; H01L 2924/01079; H01L 2924/01082; H01L 2924/01083; H01L 2924/01094; H01L 2924/01105; H01L 2924/01327; H01L 2924/10253; H01L 2924/10329; H01L 2924/12041; H01L 2924/12044; H01L 2924/13091; H01L 2924/14; H01L 2924/1433; H01L 2924/19041; H01L 2924/19042; H01L 2924/19043; H01L 2924/30105; H01L 2924/30107; H01L 2924/3011; H01L 2924/3025; H01L 2924/1032; H01L 2924/01087; H01L 2924/10272; H01L 2924/10335; H01L 2924/181; H01L 21/8221; H01L 27/0629; H01L 27/0688; H01L 27/1255; H01L 27/14603; H01L 27/14683; H01L 27/2463; H01L 27/3281; H01L 29/786; H01L 29/78648; H01L 45/12; H01L 45/1233; H01L 45/1253; H01L 45/16; H01L 51/4226; H01L 51/4253; H01L 51/50; H01L 24/85; H01L 2924/01003; H01L 2924/01004; H01L 2924/01013; H01L 2924/01024; H01L 2924/01025; H01L 2924/01061; H01L 2924/01322; H01L 2924/014

See application file for complete search history.

(56) References Cited

U.S. PATENT DOCUMENTS

2015/0309316 A1* 10/2015 Osterhout ............... G06F 3/012
  345/8
2017/0373603 A1* 12/2017 Basso ...................... H02H 3/24

* cited by examiner

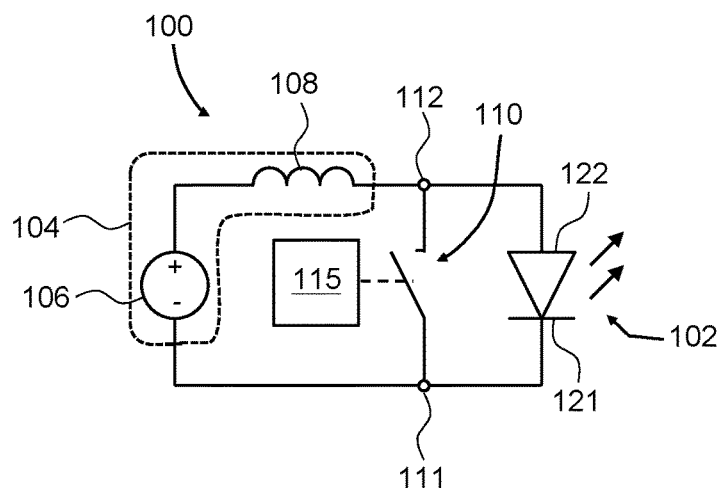
FIG. 1
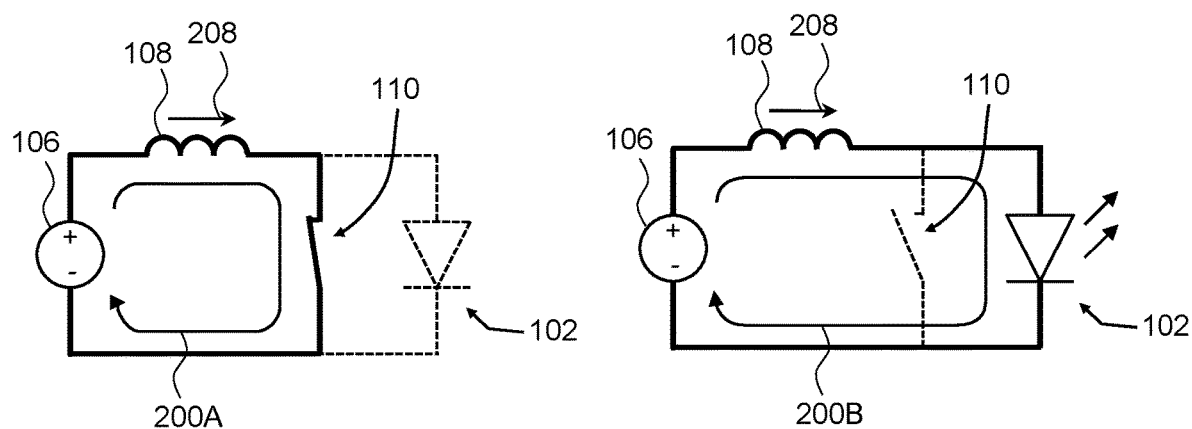
FIG. 2A
FIG. 2B

PULSED DRIVER FOR A DIODE LIGHT SOURCE

REFERENCE TO RELATED APPLICATION

The present invention is a continuation of U.S. patent application Ser. No. 16/409,037 filed on May 10, 2019 and incorporated herein by reference in its entirety.

TECHNICAL FIELD

The present disclosure relates to wearable headsets, and in particular to components and modules for wearable displays or near-eye displays.

BACKGROUND

Head-mounted displays (HMDs), near-eye displays (NEDs), and other wearable display systems can be used to present virtual scenery to a user, or to augment real scenery with dynamic information, data, or virtual objects. The virtual reality (VR) or augmented reality (AR) scenery can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted display. Because a display of HMD or NED is usually worn on the head of a user, a large, bulky, unbalanced, and/or heavy head-mounted display device would be cumbersome and may be uncomfortable for the user to wear.

Scanning projector displays provide images in angular domain, which can be observed by an eye directly, without an intermediate screen or a display panel. The lack of a screen or a display panel in a scanning projector display enables size and weight reduction of the display. A miniature scanning projector display requires a compact, bright, fast, and energy-efficient light source, as well as a corresponding electronic driver for operating such a light source.

SUMMARY

In accordance with the present disclosure, there is provided a pulsed driver for a diode light source. The pulsed driver includes a first powering terminal for coupling to one of p- and n-terminals of the diode light source, a second powering terminal for coupling to the other one of the p- and n-terminals of the diode light source, a powering circuit comprising a power source and an inductor sequentially coupled to the power source, an on/off switch coupled to the first and second powering terminals for shunting the diode light source when in a closed state, and a control circuit configured to keep the on/off switch in the closed state for charging the inductor before switching to an open state. The power source is coupled to the first powering terminal, and the inductor is coupled to the second powering terminal. A voltage provided by the power source may be lower than a threshold voltage of the diode light source for emitting light.

In some embodiments, the powering circuit lacks a catch diode, and/or the pulsed driver lacks a capacitive energy store coupled to the first and second powering terminals. The control circuit may include a programmable delay line configured to receive a first clock signal and to provide a second clock signal delayed relative to the first clock signal by a controllable amount, for keeping the on/off switch in the closed state for a configurable amount of time for charging the inductor by a configurable amount. The control circuit may further include a logic gate comprising first and second input terminals and an output terminal, where the first input terminal is configured to receive the first clock signal, the second input terminal is configured to receive the second clock signal, and where the output terminal is operably coupled to the on/off switch for controlling the on/off switch. The logic gate may include a pair of inverters coupled by a wired AND connection. Each inverter may include a gallium nitride field-effect transistor, for example. The control circuit may further include a level shifter for shifting a level of at least one of the first or second clock signal for coupling to the logic gate.

In accordance with the present disclosure, there is provided a pulsed light source comprising a diode light source comprising p- and n-terminals, and a powering circuit for powering the diode light source. The powering circuit includes a power source and an inductor sequentially coupled to the power source. The power source is coupled to one of the p- and n-terminals, and the inductor is coupled to the other one of the p- and n-terminals. An on/off switch is coupled to the p- and n-terminals for shunting the diode light source when in a closed state. A control circuit is configured to keep the on/off switch in the closed state for charging the inductor before switching to an open state. When the on/off switch is opened after the inductor has been charged, a pulsed electrical current flows through the diode light source, causing the diode light source to emit a light pulse having an energy dependent on an amount of time the on/off switch has been in the closed state before opening the on/off switch.

In some embodiments, a voltage provided by the power source is lower than a threshold voltage of the diode light source for emitting light. The diode light source may include a superluminescent light-emitting diode (SLED). The powering circuit may lack a catch diode, and the powering circuit may lack a capacitive energy store coupled to the p- and n-terminals. The control circuit may include a programmable delay line configured to receive a first clock signal provide a second clock signal delayed relative to the first clock signal by a controllable amount, for keeping the on/off switch in the closed state for a configurable amount of time for charging the inductor by a configurable amount. The control circuit may further include a logic gate comprising first and second input terminals and an output terminal. The first input terminal is configured to receive the first clock signal, the second input terminal is configured to receive the second clock signal. The output terminal is operably coupled to the on/off switch for controlling the on/off switch. In some embodiments, the logic gate comprises a pair of inverters in a wired AND configuration. Each inverter may include a gallium nitride field-effect transistor.

In accordance with the present disclosure, there is further provided a method of operating a diode light source, with p- and n-terminals of the diode light source coupled to terminals of an on/off switch. The method includes using a power source to charge an inductor through the on/off switch in a closed state for a configurable amount of time, and opening the on/off switch thereby causing electric current stored in the inductor during charging to flow through the diode light source, causing the diode light source to emit a light pulse having an energy dependent on the amount of time the on/off switch has been in the closed state before opening the on/off switch.

In some embodiments, the method further includes varying the amount of time the on/off switch is in the closed state for varying the electric current stored in the inductor. In embodiments where the diode light source comprises a superluminescent light-emitting diode (SLED), the method may further include selecting a time interval to keep the on/off switch in the closed state to cause the SLED to generate a light pulse of a controllable energy. A logic gate may be used to open and close the on/off switch. The method may further include suppressing oscillations of electric current in the diode light source upon opening the on/off switch by coupling a ringing suppression circuit to at least one of the p- and n-terminals.

BRIEF DESCRIPTION OF THE DRAWINGS

Exemplary embodiments will now be described in conjunction with the drawings, in which:

FIG. 1 is an electric circuit diagram of a pulsed driver in accordance with an embodiment of this disclosure;

FIGS. 2A and 2B are circuit diagrams of portions of the pulsed driver of FIG. 1 showing electric current flow when the on/off switch is in a closed state (FIG. 2A) and in an open state (FIG. 2B);

DETAILED DESCRIPTION

Figure 3:
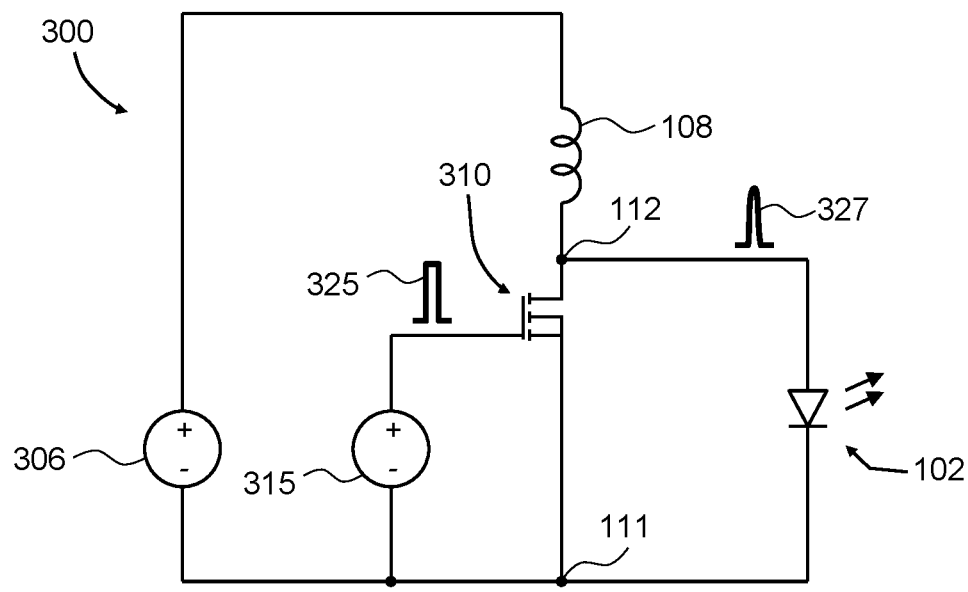
FIG. 3 is an embodiment of an electric circuit diagram of a pulsed driver using a transistor-based on/off switch.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

An electronic driver for driving a semiconductor light source, such as a light-emitting diode or a laser diode, may include a circuit for providing powering pulses of a controllable magnitude and/or duration to the diode. The powering pulses, when amplified directly, may give rise to complex, amplitude-variant ringing of the powering current. This ringing may result in image artifacts when scanning or rastering the optical beam generated by the semiconductor light source. In accordance with the present disclosure, a powering circuit may include an inductor charged during a charging cycle for a controllable amount of time. The energy of the charged inductor may then be used to power the semiconductor light source. In such a driving configuration, a residual ringing may remain nearly constant and thus may be suppressed using an appropriately configured circuit. Using the powering circuit instead of a linear amplifier for driving a diode light source may have an additional advantage of higher conversion efficiency.

Referring to FIG. 1, a pulsed driver 100 provides electrical pulses for driving a diode light source 102. The diode light source 102 may include single-mode light source or a multimode light source. By way of non-limiting examples, the single-mode or multimode light source may include a light-emitting diode (LED), a superluminescent light-emitting diode (SLED), a side-emitting laser diode, a vertical cavity surface-emitting laser diode (VCSEL), etc. The pulsed driver 100 includes first 111 and second 112 powering terminals for coupling to a n-terminal 121 (cathode) and p-terminal 122 (anode), respectively, of the diode light source 102.

A powering circuit 104 of the pulsed driver 100 includes sequentially coupled a power source 106 and an inductor 108. The power source 106 is coupled to the first powering terminal 111, and the inductor is coupled to the second powering terminal 112. The power source 106 may include a power adapter, a stabilized current and/or voltage source, a battery, etc. The inductor 108 may include a wire coil with or without a magnetic core, or merely a length of a wire with a required inductance. The inductance may be constant or adjustable.

An on/off switch 110 is directly coupled between the first 111 and second 112 powering terminals, as shown. When in a closed position or state, the on/off switch 110 enables the inductor 108 to be charged by the power source 106. In the closed state, the on/off switch 110 also short-circuits or shunts the first 111 and second 112 powering terminals. When in open position or state, the on/off switch 110 presents a high enough electrical resistance that the current through the on/off switch 110 is zero or at least much smaller than a current flowing through the diode light source 102. The on/off switch 110 may include, for example, a transistor e.g. a field-effect transistor (FET), an electronic relay, a bipolar transistor, etc.

A control circuit 115 is operably coupled to the on/off switch 110 for controlling the on/off switch 110, i.e. for opening and closing the on/off switch 110 for providing a powering pulse to the diode light source 102. In operation, the control circuit places the pulsed driver 100 in one of at least two states, a charging state when the on/off switch 110 is closed, and a powering, or pulsing state when the on/off switch 110 is open.

FIG. 2A illustrates the operation of the pulsed driver 100 in the charging state when the on/off switch 110 is closed. The on/off switch 110 couples the inductor 108 to the power source 106. The power source 106 provides a charging electric current 200A that charges the inductor 108. Herein, the term "charges" is meant in the following sense. Initially, the inductor 108 resists the flow of the charging electric current 200A via the inductance of the inductor 108, and a magnetic field 208 grows in magnitude and stores some energy, causing the inductor 108 to become "charged". The direction of the magnetic field 208 is shown only as an illustration, and may be different for inductors of different shapes. The longer the on/off switch 110 is in the closed position, the more energy is stored in the inductor 108, for as long as the charging electric current 200A is growing. In other words, charging may be performed until the charging electric current 200A reaches its maximum or saturation value.

FIG. 2B illustrates the operation of the pulsed driver 100 in the pulsing state when the on/off switch 110 is open. In this state, when the inductor 108 is charged, opening the electrical circuit by the on/off switch 110 causes an increase of a voltage between the first 111 and second 112 powering terminals, at least in part due to the energy stored in the magnetic field 208 of the inductor 108. A discharging electric current 200B may now flow through the diode light source 102, causing the diode light source 102 to emit a light pulse. The discharging electric current 200B is flowing through the diode light source 102 until the energy stored in the inductor is depleted. The inductance of the inductor 108 may be selected such that the energy stored in the inductor 108 will be dissipated by the diode light source by the time next charging cycle starts. The voltage of the power source 106 needs to be lower than a threshold voltage of the diode light source 102, i.e. a voltage at which the diode light source 102 begins to emit light, to prevent continuous light output by the diode light source 102 when the on/off switch 110 is open.

The energy of the emitted light pulse, i.e. the number of photons emitted, depends on the energy stored in the inductor 108, which in turn depends on the duration of time during which the on/off switch 110 was closed. The control circuit 115 (FIG. 1) may be configured to keep the on/off switch 110 in the closed state for a configurable amount of time, for charging the inductor 108 by a controllable amount. This, in its turn, causes the diode light source 102 to emit a light pulse of a controllable energy.

An equivalent exemplary circuit 300 of an implementation of the pulsed driver 100 of FIGS. 1, 2A, and 2B is presented in FIG. 3. The equivalent exemplary circuit 300 includes a voltage source 306 corresponding to the power source 106, a programmable voltage source 315 corresponding to the control circuit 115, and a field effect transistor (FET) 310 corresponding to the on/off switch 110, and performing a similar function. The programmable voltage source 315 provides a positive gate pulse 325 of a configurable duration. The gate pulse 325 opens the FET 310, causing the current to flow through the inductor 108 and enabling the voltage source 306 to charge the inductor 108 by accumulating or growing its magnetic field. When the gate pulse 325 ends, the FET 310 closes i.e. increases its electrical resistance, causing a pulse of driving current, i.e. a driving pulse 327 to flow through the diode light source 102. It is noted that the "closed" on/off switch 110 corresponds to the open FET 310, and the "open" on/off switch 110 corresponds to the closed FET 310, in accordance with the accepted terminology. Any suitable FET may be used in place of the FET 310, e.g. a gallium nitride (GaN) FET, or another type FET, or another type of a transistor or an electronic gate.

Notably, the equivalent circuit 300, and the pulsed driver 100 for that matter, lacks a so-called catch diode, which is used in boost converters of electric power. In boost converters, the catch diode (also termed a blocking diode or a flyback diode) is used to block a reverse current flow, which would otherwise drain the boost converter output. In the pulsed driver 100 represented by the equivalent circuit 300, a catch diode is not needed, since the diode light source 102 itself, i.e. the load of the pulsed driver 100, may perform the function of the catch diode. Furthermore, the equivalent circuit 300 and the pulsed driver 100 both lack a capacitive energy store found in boost converters in order to prevent the pulsed energy from being averaged.

Figure 4A:
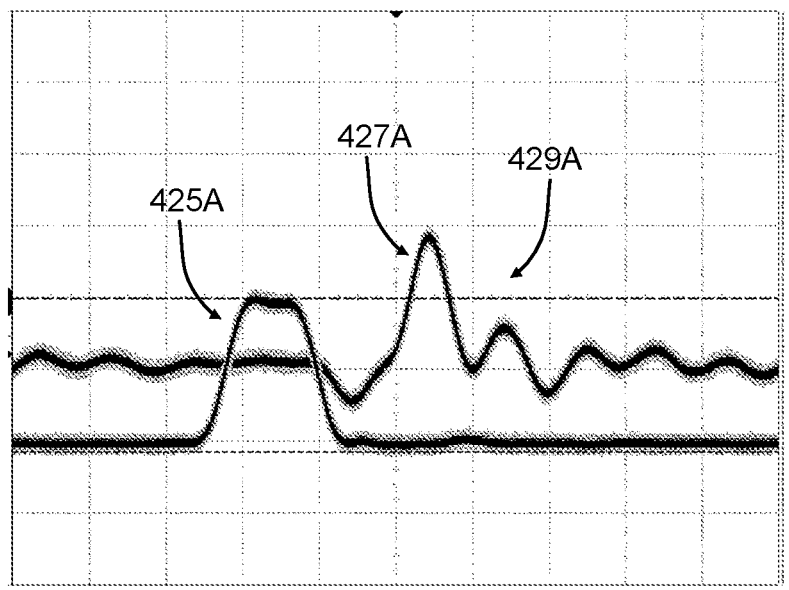
FIGS. 4A to 4D are electric waveforms of a gate pulse and an output powering pulse at different durations of the gate pulse in the electric circuit diagram of FIG. 3, the durations increasing in going from FIG. 4A to FIG. 4D.
Figure 4B:
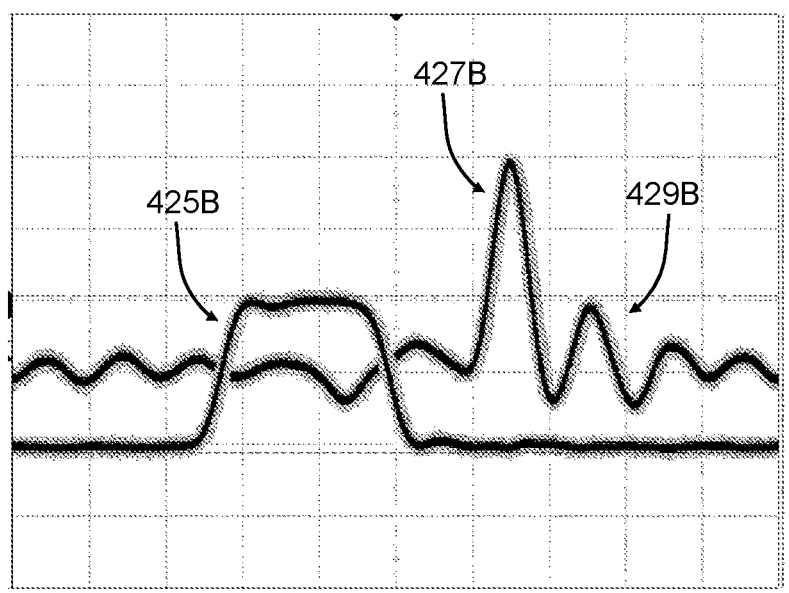
Figure 4C:
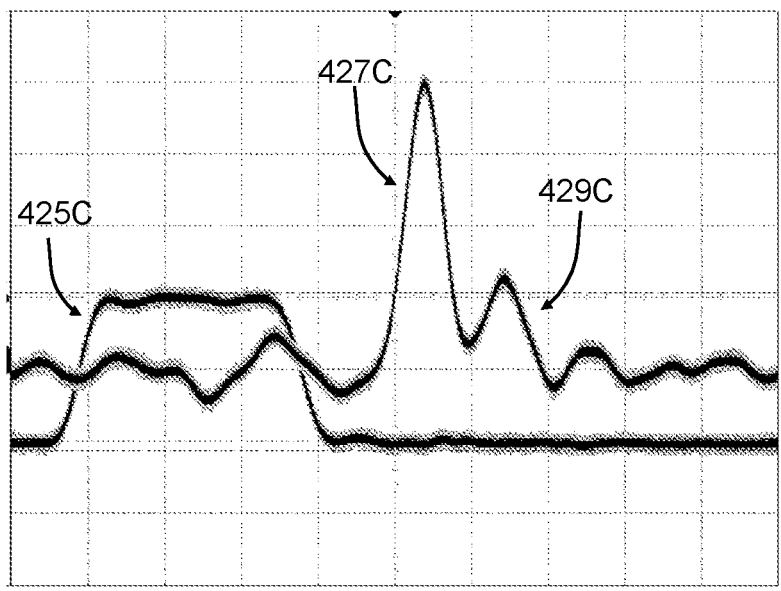
Figure 4D:
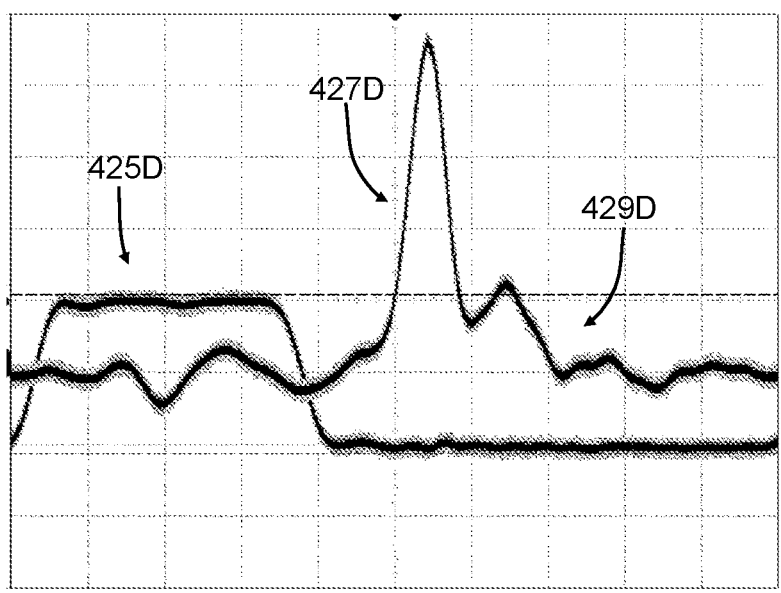

Referring to FIGS. 4A to 4D, measured voltage at the gate of the field transistor 310 and a current flowing through the diode light source 102 are plotted as a function of time for the gate pulse 325 durations of approximately 10 ns (FIG. 4A), 20 ns (FIG. 4B), 27 ns (FIG. 4C), and 35 ns (FIG. 4D). In FIGS. 4A to 4D, one horizontal division corresponds to 10 ns, and one vertical division corresponds to 2V for voltage, and 100 mA for current. In FIG. 4A, a gate pulse 425A is about 4V in magnitude and 10 ns in duration. A resulting driving current pulse 427A is about 7 ns long and has an amplitude of approximately 200 mA. In FIG. 4B, a gate pulse 425B is about 4V in magnitude and 20 ns in duration. A resulting driving current pulse 427B is about 7 ns long and has an amplitude of approximately 280 mA. In FIG. 4C, a gate pulse 425C is about 4V in magnitude and 27 ns in duration. A resulting driving current pulse 427C is about 7 ns long and has an amplitude of approximately 350 mA. Finally, in FIG. 4D, a gate pulse 425A is about 4V in magnitude and 35 ns in duration. A resulting driving current pulse 427D is about 7 ns long and has an amplitude of approximately 420 mA. Therefore, the amplitude of the driving current pulses 427A-427D monotonically depends on the duration of the corresponding gate pulses 425A-425D.

Further, it is noted that residual ringing patterns 429A to 429D of the corresponding driving current pulses 427A to 427D remain similar at different driving current amplitudes. This enables one to tune the ringing patterns out by providing a corresponding ringing suppression circuit coupled to at least one of the first 111 or second 112 powering terminals for reducing oscillations of electric current in the diode light source 102 upon opening the on/off switch 110, i.e. the field transistor 310.

Figure 5:
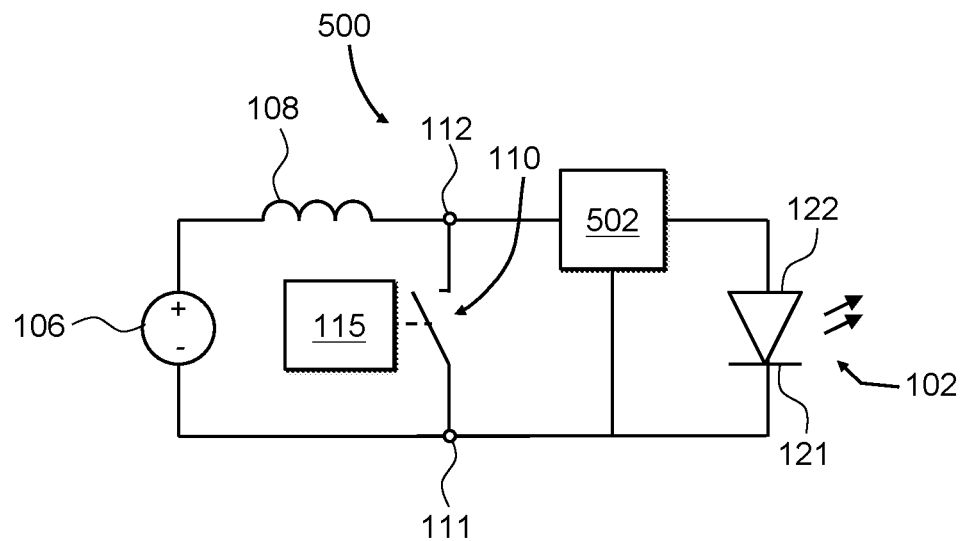
FIG. 5 is an electric circuit diagram of a pulsed driver embodiment including a ringing dampening circuit.

Referring to FIG. 5, a pulsed driver 500 is an embodiment of the pulsed driver 100 of FIG. 1. The pulsed driver 500 includes a ringing suppression circuit 502 coupled to the first 111 and second 112 powering terminals. The diode light source 102 is coupled to the ringing suppression circuit 502. The ringing suppression circuit 502 may include a resistor-capacitor (RC) circuit, a resistor-inductor (RL) circuit, or a resistor-inductor-capacitor (RLC) circuit configured for reducing oscillations of electric current in the diode light source 102 upon closing the on/off switch 110. The resistors, inductors, and/or capacitors of the ringing suppression circuit 502 may be coupled in groups to match the frequency-dependent impedance of the load, including the diode light source 102, to a frequency-dependent impedance of the pulsed driver 500.

Figure 6:
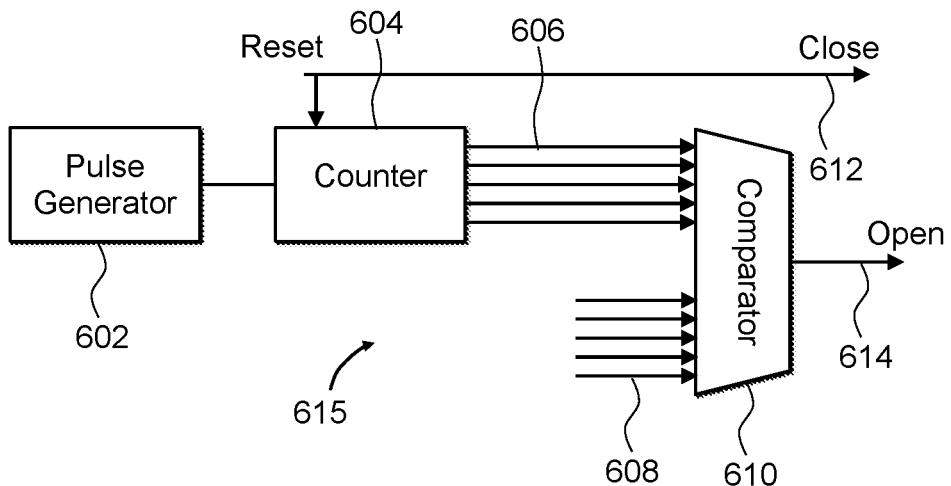
FIG. 6 is a block diagram of a control circuit for controlling the on/off switch based on a digital ramp generator and a programmable digital comparator circuit.

Control circuit implementations for pulsed drivers of the present disclosure will now be considered. Referring to FIG. 6, a control circuit 615 includes a pulse generator 602 configured for generating a succession of electric pulses at a pre-determined rate or frequency. A counter 604 is coupled to the pulse generator 602 for counting pulses of the pulse generator 602, providing a digital count-up at a first bus 606. A comparator 610 compares the digital count-up at a first bus 606 with a control word indicating a threshold count at a second bus 608. When the two coincide, the comparator 610 outputs an "open" signal 614. A Reset command resets the counter 604 to zero, and the threshold count word is applied to the second bust 608. The Reset command also functions as a "close" signal 612 closing the on/off switch 110 (FIG. 1), such that storing of the energy by the inductance 108 may begin. The comparator 610 (FIG. 6) compares the current digital count with the threshold digital count. Once the two coincide, the comparator 610 sends the "open" signal 614 which is used to open the on/off switch 110, causing a light pulse to be emitted by the diode light source 102. The larger the threshold count, the higher is the energy of the emitted light pulse. A countdown may also be used where the counter 604 is initially loaded with a number, which decreases with receiving each pulse from the pulse generator 604, and the comparator 610 or a similar device provides an output pulse when the count is zero. Analog versions of the control circuit 615 may also be used.

Figure 7A:
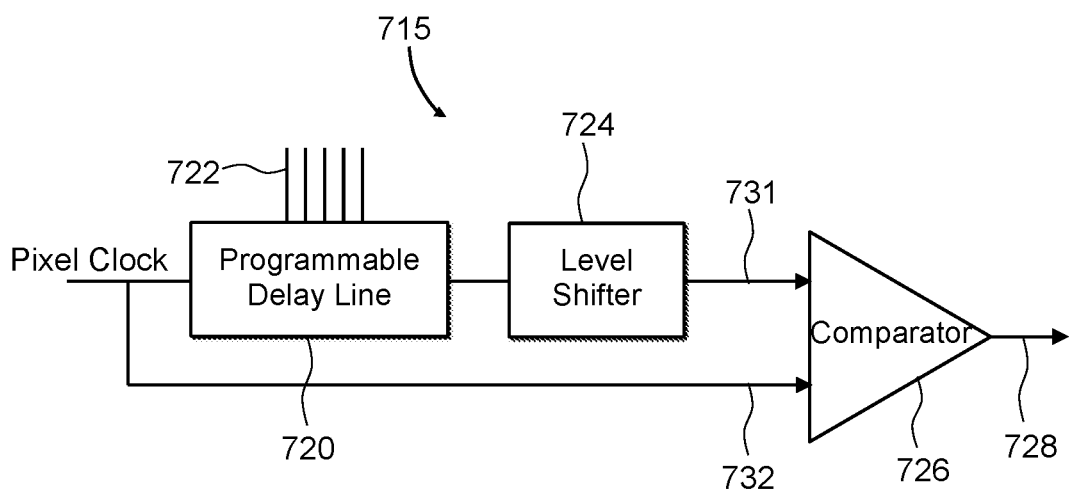
FIG. 7A is a block diagram of a control circuit for controlling the on/off switch based on a programmable delay line and a level shifter.

Referring to FIG. 7A, a control circuit 715 is based on a programmable element, specifically a programmable delay line 720, and a fast analog comparator 726. The programmable delay line 720 is configured to delay an input pulse by a programmable time interval represented by a control word on a bus 722. A level shifter 724 may be configured to shift a level of an input pulsed signal. The fast analog comparator 726 provides a high signal at its output terminal 728 when a voltage at its first input terminal 731 is above the voltage at its second input terminal 732, and a low signal when the voltage at the first input terminal 731 is below the voltage at the second input terminal 732. Herein, the term "fast analog comparator" relates to a comparator capable of operating down to a time regime of the order of tens of nanoseconds or faster.

Figure 7B:
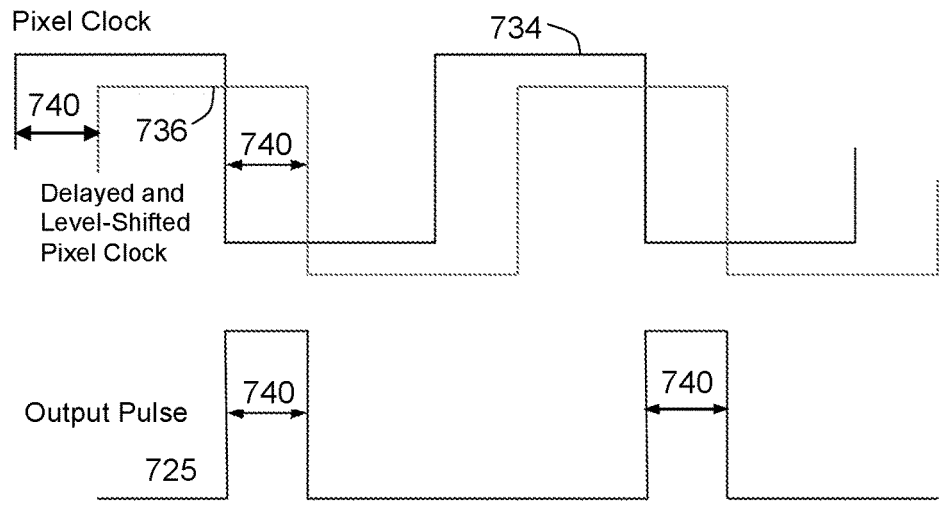
FIG. 7B is a diagram of waveforms of a pixel clock signal and an output pulse in the control circuit of FIG. 7A.

The operation of the control circuit 715 of FIG. 7A is illustrated in FIG. 7B. A pixel clock signal 734 is applied to both the programmable delay line 720 and the second input terminal 732 of the fast analog comparator 726. The programmable delay line 720 delays the pixel clock signal 734 by a programmable time interval, or a time delay 740. The delayed pixel clock signal 734 is applied to the level shifter 724. The level shifter 724 shifts the delayed pixel clock signal 734 by a portion of its amplitude. A shifted and delayed pixel clock signal 736 is applied to the first input terminal 731 of the fast analog comparator 726. The fast analog comparator 726 compares the two signals at its input terminals 731 and 732 and produces an output pulse 725 at an output terminal 728. The output pulse 725 has substantially the same pulse duration or width 740 as the delay of the programmable delay line 720. In some embodiments, the generated delay can range between about 2 ns and 12 ns with a resolution of about 10 ps. In some embodiments, pulsewidths of the generated output pulse 725 may differ in absolute sense from the time delay of the programmable delay line 720 due to a finite speed of the fast analog comparator 726, but is nonetheless dependent in the time delay of the programmable delay line 720 in a predictable e.g. monotonic manner.

Figure 8:
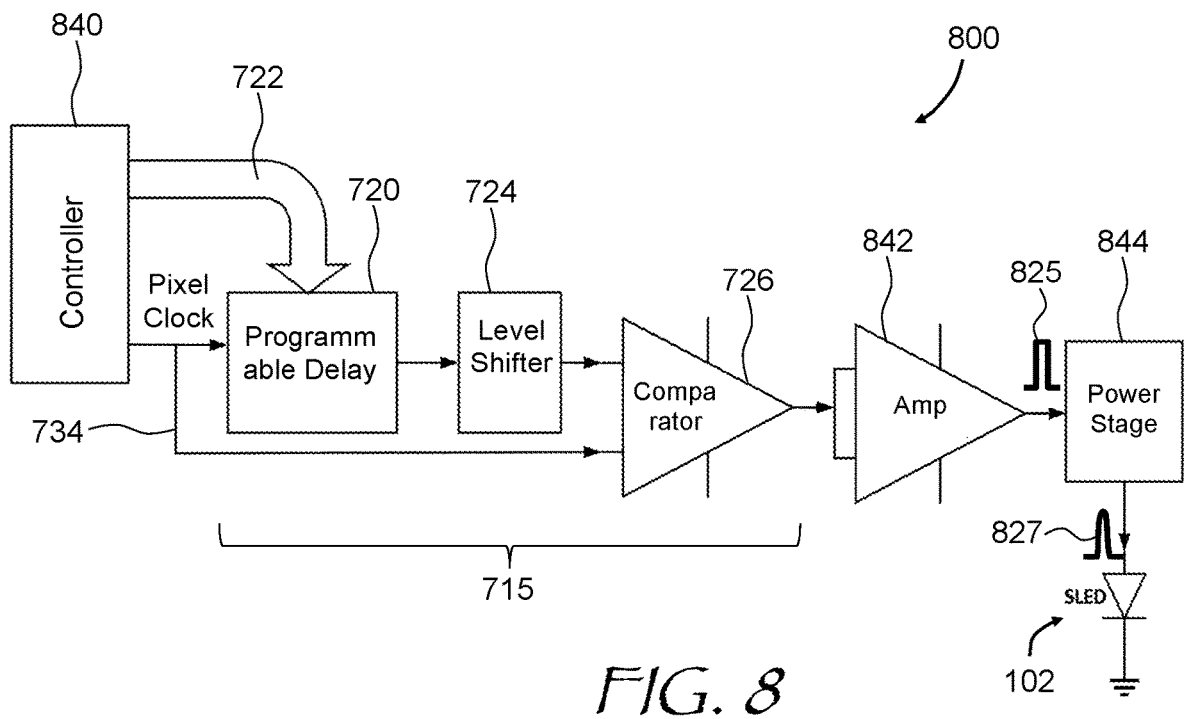
FIG. 8 is a block diagram of an embodiment of a pulsed driver for a semiconductor light source.

Referring to FIG. 8, a pulsed light source 800 includes a digital controller 840, the control circuit 715 of FIG. 7A, an amplifier 842, a power stage 844, and the diode light source 102 such as an SLED, for example. The digital controller 840 is configured for providing the pixel clock signal 734 to the control circuit 715 and for providing control words to the bus 722 of the programmable delay line 720 for setting the time delay 740 of the programmable delay line 720. The control circuit 715 provides the output pulse 725 (FIG. 7B) having the pulsewidth, or pulse duration, in accordance with the time delay 740 as described above with reference to FIGS. 7A and 7B. The output pulse 725 is applied to the amplifier 842, which amplifies the output pulse 725. An amplified pulse 825 is applied to the power stage 844, which operates similarly to the equivalent exemplary circuit 300 of FIG. 3, with the amplified pulse 825 performing the function of the gate pulse 325, and the amplitude of a driving pulse 827 driving the diode light source 102 depending on the duration of the amplified pulse 825. In this manner, the digital controller 840 may control the emitted light pulse energy, i.e. the number of photons emitted by the diode light source 102, by setting the control words on the bus 722. The digital controller 840 may also control the timing of the emitted light pulses via the pixel clock signal 734.

It is to be understood that other configurations of drivers for the diode light source 102 are possible. For example, the level shifter 724 and the programmable delay 720 may be swapped, the polarity of signals and direction of signal offsets may be reversed, the amplifier 842 and other elements may be omitted or replaced with equivalent circuits, etc.

Figure 9A:
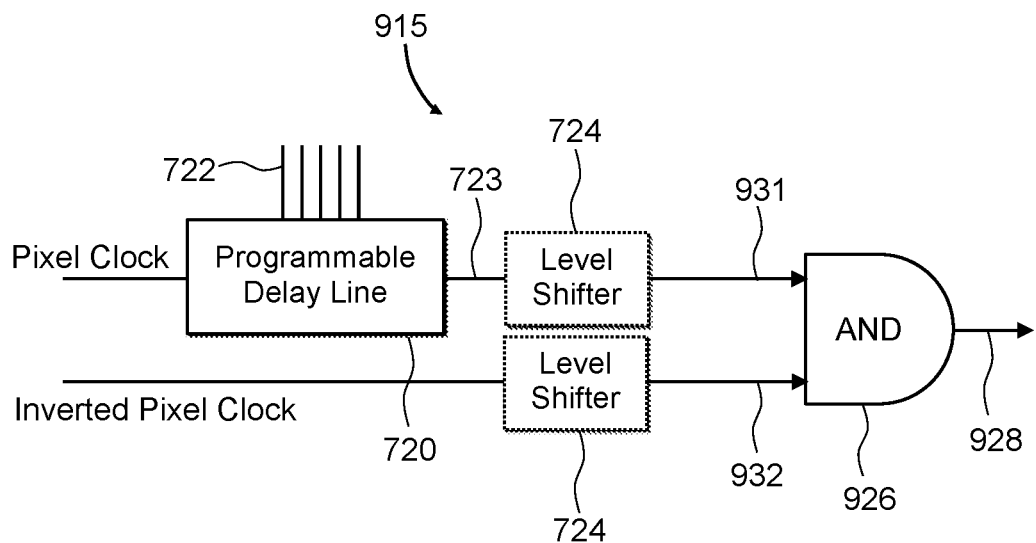
FIG. 9A is a block diagram of a control circuit for controlling the on/off switch based on a programmable delay line and an "AND" logic gate.
Figure 9B:
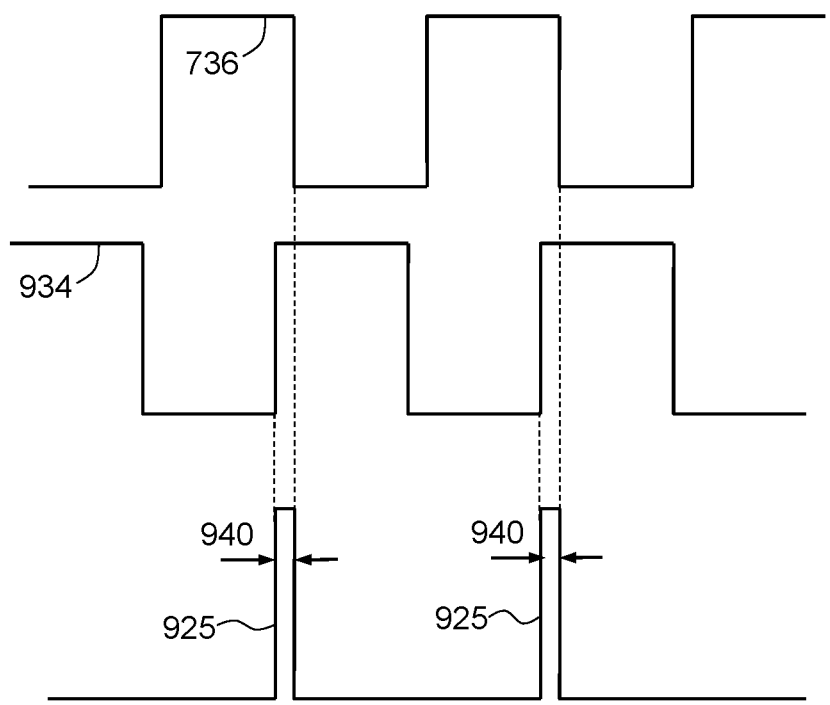
FIG. 9B is a diagram of waveforms of a pixel clock signal and an output pulse in the control circuit of FIG. 9A.

Referring to FIGS. 9A and 9B, a control circuit 915 is based on the programmable delay line 720 and an AND logic gate 926. The programmable delay line 720 is configured to delay an input waveform, in this case the pixel clock signal, by a programmable time interval represented by a control word on the bus 722, providing the delayed pixel clock signal 736 (FIG. 9B) at its output terminal 723 (FIG. 9A). The AND logic gate 926 has first 931 and second 932 input terminals and an output terminal 928. In the embodiment shown, the first input terminal 931 of the AND logic gate 926 is coupled to an output terminal of the programmable delay line 720 to receive the delayed pixel clock signal 736 (FIG. 9B), and the second terminal 932 of the AND logic gate 926 is coupled to receive an inverted pixel clock signal 934. The first 931 and second 932 terminals are coupled via optional level shifters 724. If the programmable delay line 720 were absent, or if the programmable delay line 720 were programmed to provide a zero delay, the AND logic gate 926 would always output a low (FALSE) signal, because S (a logical signal) AND NOT S is FALSE for any signal S. When the programmable delay line 720 is configured to provide a non-zero delay 940, a time interval exists when both the delayed pixel clock signal 736 and the inverted pixel clock signal 934 are both high (TRUE) signals, and during that time interval, the signal at the output terminal 928 of the AND logic gate 926 is high (TRUE), producing an output pulse 925 having a pulse duration (also termed pulsewidth) substantially equal to the non-zero delay 940.

The output terminal 928 of the AND logic gate 926 may be operably (i.e. directly or indirectly, e.g. via a matching circuit) coupled to an on/off switch, e.g. the on/off switch 110 of FIGS. 1, 2A, 2B, and 5, or the FET 310 of FIG. 3, for controlling the switching state of the on/off switch. The level shifter(s) 724 may be provided to adjust operational levels of the delayed pixel clock signal 736 and the inverted pixel clock signal 934 to accommodate input signal requirements of the AND logic gate 926. A non-inverted pixel clock signal may also be used in place of the inverted pixel clock signal 934; for the latter case, a corresponding half-period time delay may be provided by the programmable delay line 720.

Many other modifications of the control circuit 915 are possible. By way of a non-limiting example, referring to FIGS. 10A and 10B, a control circuit 1015 is based on the programmable delay line 720 and an OR logic gate 1026. The programmable delay line 720 is configured to delay the pixel clock signal by a programmable time interval represented by the control word on the bus 722, providing a delayed pixel clock signal to a NOT logic circuit 1090, essentially inverting the delayed pixel clock signal to produce a delayed inverted pixel clock signal 1036 (FIG. 10B). The OR logic gate 1026 (FIG. 10A) has first 1031 and second 1032 input terminals and an output terminal 1028. In the embodiment shown, the first input terminal 1031 of the OR logic gate 1026 is coupled to an output terminal of the NOT logic circuit 1090 to receive the delayed inverted pixel clock signal 1036 at the first input terminal 1031 of the OR logic gate 1026. The second input terminal 1032 of the OR logic gate 1026 is coupled to receive a double-inverted pixel clock signal 1034 (FIG. 10B), i.e. the original pixel clock signal, at the second input terminal 1032 of the OR logic gate 1026. The bottom NOT logic circuit 1090 may be omitted, and instead the original pixel clock signal may be applied to the second input terminal 1032 of the OR logic gate 1026.

If the programmable delay line 720 were absent, or if the programmable delay line 720 were programmed to provide a zero delay, the OR logic gate 1026 would always output a high (TRUE) signal, because S (a logical signal) OR NOT S is TRUE for any signal S. When the programmable delay line 720 is configured to provide a non-zero delay 1040, a time interval exists when both the delayed inverted pixel clock signal 1036 and the double-inverted pixel clock signal 1034 (i.e. the original clock signal) are both low (FALSE) signals, and during that time interval, the signal at the output terminal 1028 of the OR logic gate 1026 is low (FALSE), producing a negative output pulse 1025 at the output terminal 1028. The negative output pulse 1035 has a pulse duration (also termed pulsewidth) substantially equal to the non-zero delay 1040. The negative output pulse 1025 is inverted by the rightmost NOT logic circuit 1090 (i.e. inverter) in FIG. 10A, producing a positive output pulse, which may be operably coupled to an on/off switch, e.g. the on/off switch 110 of FIGS. 1, 2A, 2B, and 5, or the FET 310 of FIG. 3, for controlling the state of the on/off switch. Optional level shifter(s) 724 may be provided to adjust operational levels of the delayed pixel clock signal 736 and the inverted pixel clock signal 934 to accommodate input signal requirements of the NOT logic circuits 1090. It is noted that the OR logic gate 1026 with the NOT logic circuits 1090 at both of its input terminals 1031, 1032 and its output terminal 1028 form an equivalent AND logic gate 926* (as compared to the AND logic gate 926 of FIG. 9A).

Figure 10A:
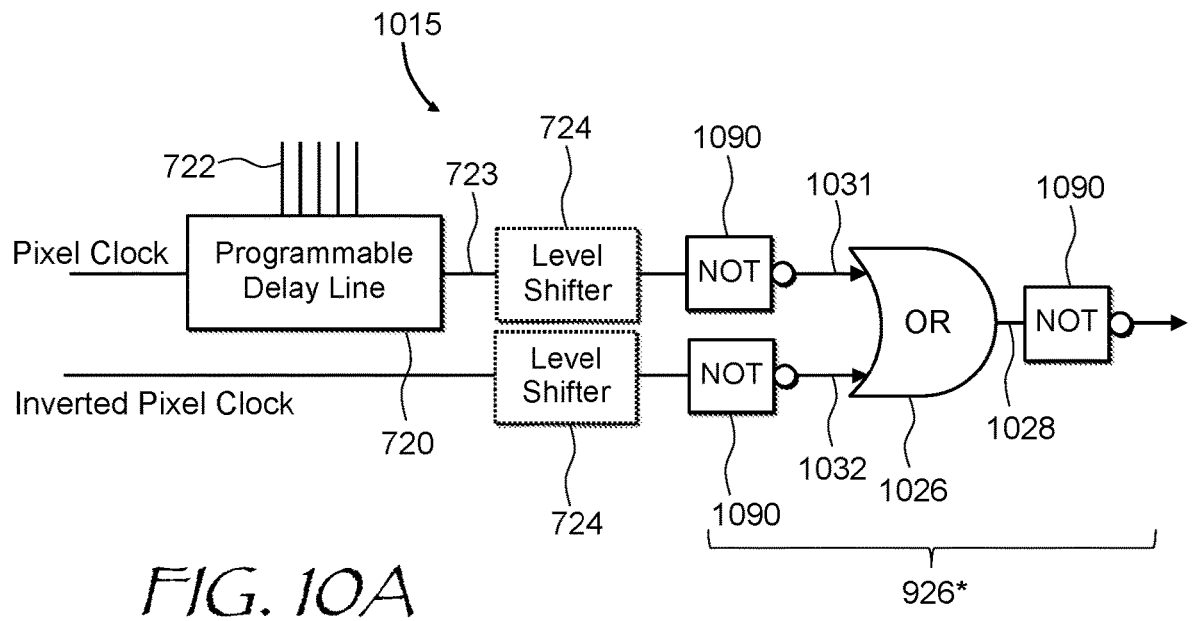
FIG. 10A is a block diagram of a control circuit for controlling the on/off switch based on a programmable delay line and an "OR" logic gate.
Figure 10B:
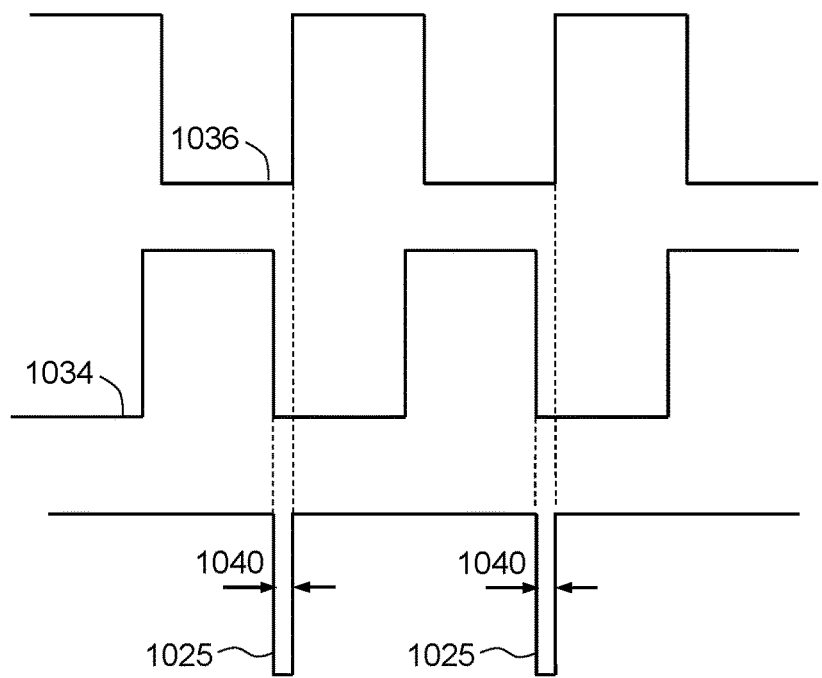
FIG. 10B is a diagram of waveforms of a pixel clock signal and an output pulse in the control circuit of FIG. 10A.
Figure 11:
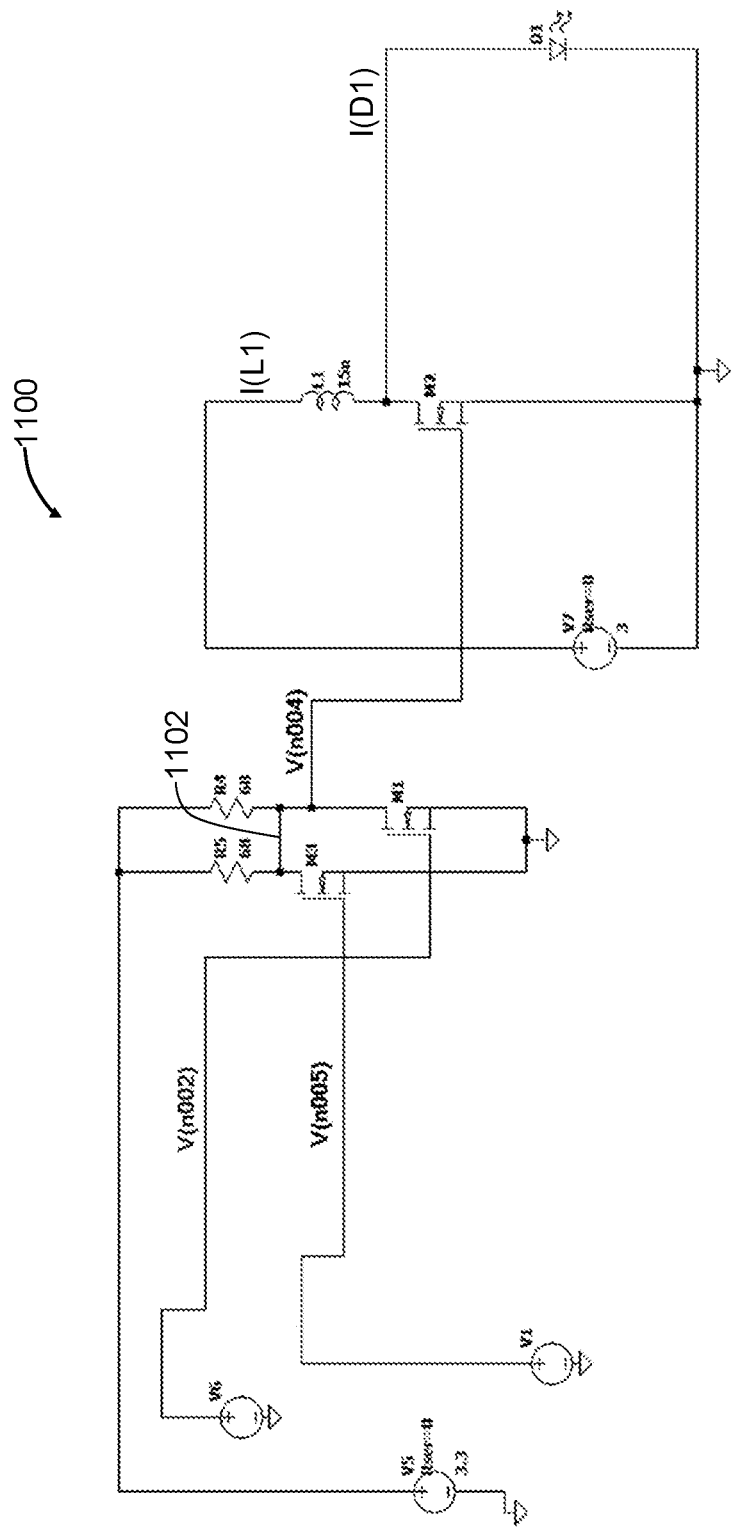
FIG. 11 is a schematic of a pulsed light source including an electric circuit diagram of a pulsed driver using a transistor-based on/off switch and a logic gate.

One possible implementation of the control circuit 1015 of FIG. 10A is illustrated in FIG. 11, which shows an equivalent electrical circuit of an analog portion of an electronic driver for a diode light source D1. The electronic driver and the diode light source are a part of a pulsed light source 1100. The electronic driver includes a pair of FETs M1 and M3 in an inverter configuration coupled together at a common terminal 1102. The common terminal 1102 functions as a "wired AND" connection. The resistors R4 and R5 may be replaced with a single resistor (of 34 Ohm) for simplicity.

Voltages V(n005) of a source V1 and V(n002) of a source V6 correspond to the delayed 736 and inverted 934 pixel clock signals of FIG. 9B. The voltages V(n005) and V(n002) are inverted at the common terminal 1102, because when a "high" voltage is applied to gates of either of the FETs M1 or M3, or both FETs M1 and M3, the FETs M1 and/or M3 open, causing an output voltage V(n004) at the common terminal 1102 to drop, i.e. to have a "low" value. Therefore, the circuit including the FETs M1, M3, and the common terminal 1102, functions as a NOR gate with respect to the input voltages V(n002) and V(n005): for the output voltage V(n004) at the common terminal 1102 to have a "high" value, both voltages V(n005) of the source V1 and V(n002) of the source V6 need to be "low" voltages, as the delayed inverted signal 1036 and double inverted signal 1034 in FIG. 10B. The output voltage V(n004) is applied to the gate of the FET M2, which performs the function of an on/off switch controlling charging of an inductance L1 for powering the diode light source D1, similarly to what has been explained above with reference to FIGS. 1, 2A, 2B, and 3.

Figure 12A:
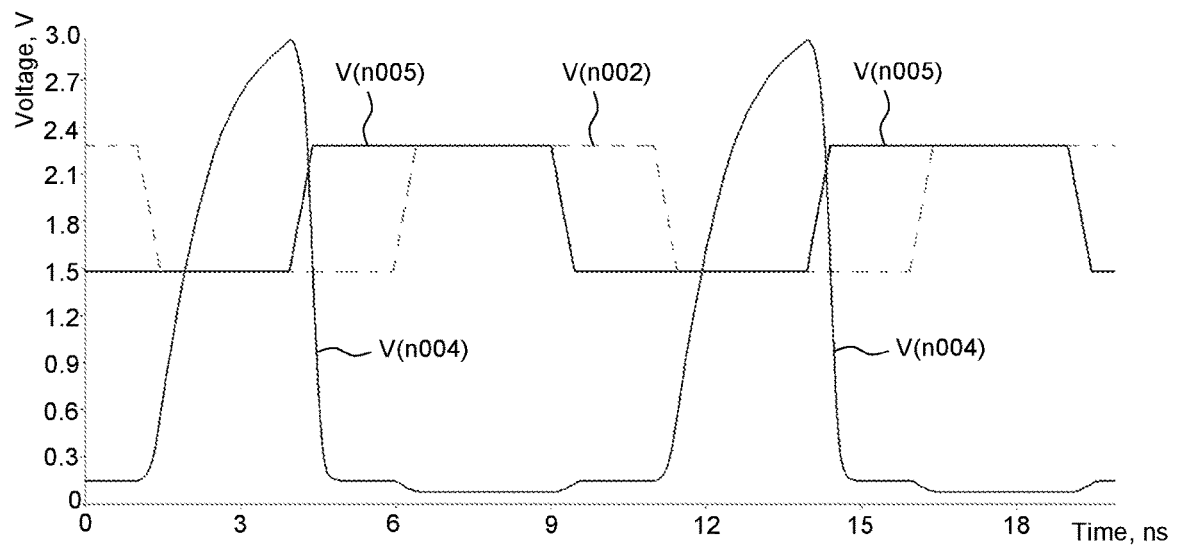
FIGS. 12A and 12B are diagrams of simulated waveforms of a pixel clock signal, a delayed pixel clock signal, a gate voltage of the on/off switch, a current through the inductor, and a current through the diode light source of FIG. 11.
Figure 12B:
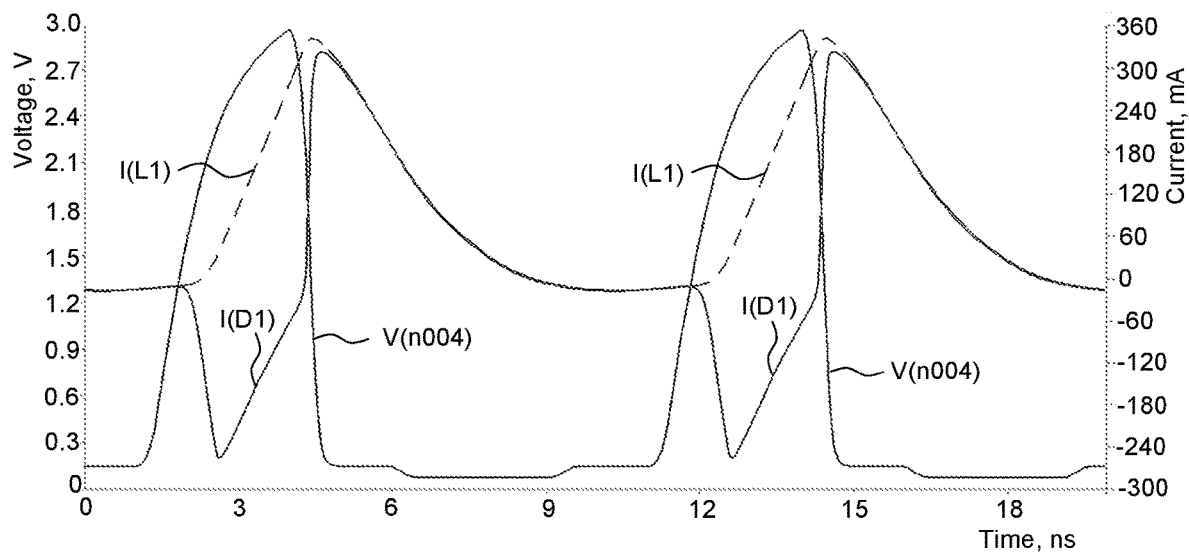

Results of a numerical simulation for the circuit of FIG. 11 including GaN FETs M1, M2, and M3 with the inductance and resistance values indicated in FIG. 11 are shown in FIGS. 12A and 12B. Referring first to FIG. 12A, the voltages V(n005) of the source V1 and V(n002) of the source V6 correspond to the pixel clock signal 1034 and the delayed inverted pixel clock signal 1036, respectively, of FIG. 10B. When both voltages V(n005) and V(n002) are low, i.e. about 1.5V, the voltage V(n004), which is an inverted version of the negative pulse 1025 of FIG. 10B, is high i.e. above 2.3V. This voltage opens the on/off switch FET M2 (FIG. 11), causing an inductance current I(L1) to rise and a diode current I(D1) to oscillate between the negative and positive values, as shown. The negative current flow through the diode light source D1 is the charging current of the diode's parasitic capacitance. During the positive portion of oscillation, the diode light source D1 (FIG. 11) emits a light pulse.

Figure 13:
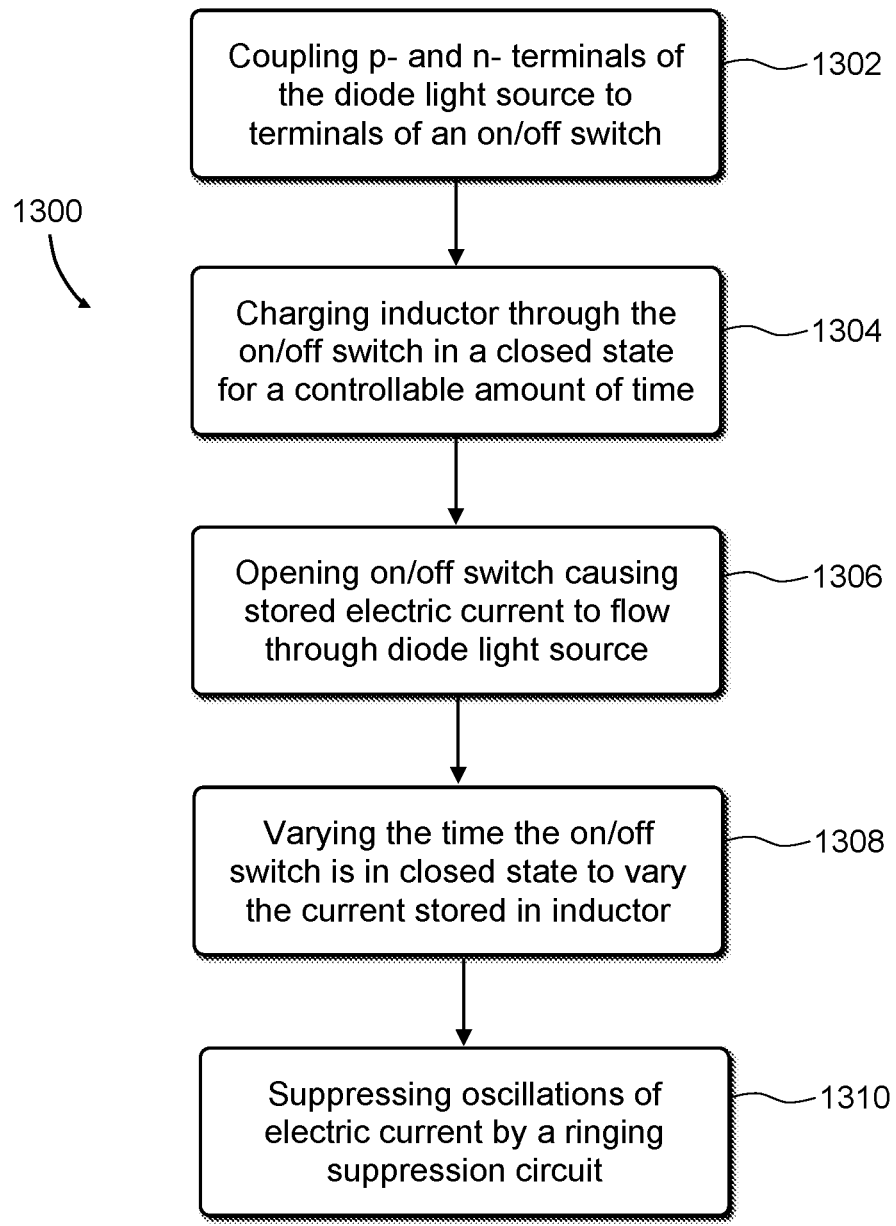
FIG. 13 is a flow chart of a method of driving a diode light source in accordance with this disclosure.

Turning to FIG. 13, a method 1300 of driving a diode light source, e.g. the diode light source 102 of FIGS. 1, 2A, 2B, FIG. 3, FIG. 5, or FIG. 8, and/or the diode light source D1 of FIG. 11, includes coupling (1302) p- and n-terminals of the diode light source to terminals of an on/off switch, e.g. the on/off switch 110 of FIGS. 1, 2A, and 2B, the FET 310 of FIG. 3, or a similar device. An inductor, e.g. the inductor 108 of FIGS. 1, 2A, and 2B, FIG. 3, or the inductor L1 of FIG. 11, is charged (1304) through the on/off switch in the closed state for a controllable amount of time. The on/off switch is then opened (1306), thereby causing electric current stored in the inductor during charging to flow through the diode light source, as explained above. The p- and n-terminals of the diode light source may be coupled to the terminals of the on/off switch without using a catch diode, as shown in FIG. 1 and FIG. 3.

The method 1300 may further include selecting a time interval and /or varying (1308) the time interval during which the on/off switch is in the closed state, for controlling and/or varying energy stored in the inductor. The selecting and varying may be performed using any of the circuits described herein, e.g. the circuits of FIGS. 7A, FIG. 8, FIG. 9A, and/or FIG. 10A. For example, the digital controller 840 may select a time interval to keep the on/off switch in the closed position or state, to cause the diode light source to generate a light pulse of a controllable energy. In some embodiments, the method 1300 may further include suppressing (1310) oscillations of electric current in the diode light source upon opening the on/off switch by coupling a ringing suppression circuit (e.g. as shown in FIG. 5) to at least one of the first and second terminals. The ringing suppression circuit may include tunable elements for tuning the ringing with a particular diode light source as a load.

Figure 14A:
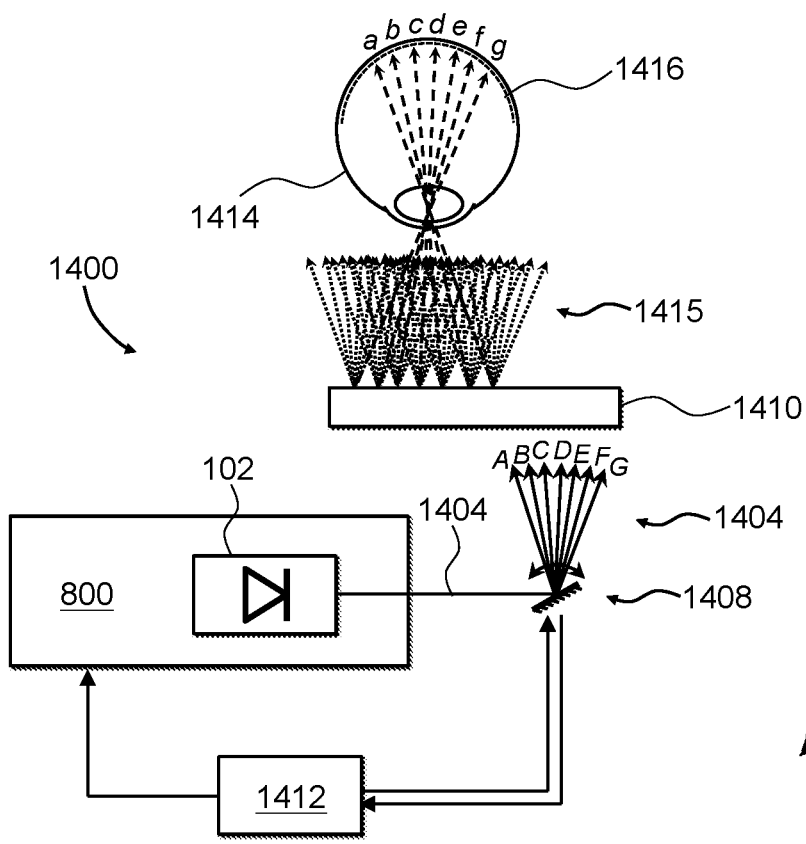
FIG. 14A is a schematic view of a projection display illustrating its principle of operation.
Figure 14B:
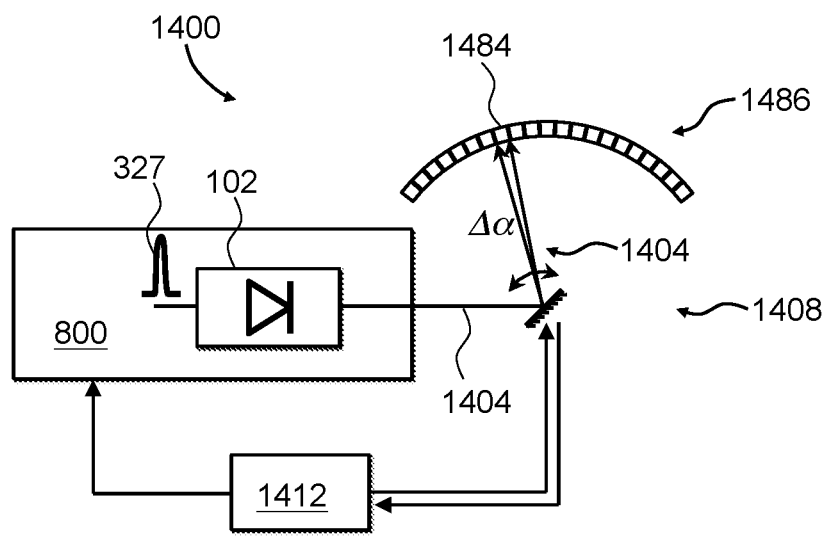
FIG. 14B is a schematic view of the projection display of FIG. 14A scanning across a pixel of an image.

The pulsed light source 800 of FIG. 8, and/or the pulsed light source 1100 of FIG. 11, driven according to the method 1300 of FIG. 13, may be used in a scanning projector display 1400 of FIGS. 14A and 14B. In this example, the scanning projector display 1400 includes the pulsed light source 800 providing a light beam 1404. A scanner 1408 is optically coupled to the pulsed light source 800 for scanning the light beam in one or two dimensions, e.g. about an X-axis and/or Y-axis perpendicular to the X-axis. A pupil replicator 1410 provides a light field 1415 including multiple laterally displaced parallel copies of the scanned light beam 1404.

A display controller 1412 is operably coupled to the scanner 1408 and the pulsed light source 800 and is configured for operating the pulsed light source 800 in coordination with scanning the scanner 1408. As an illustration, the controller 1412 may cause the scanner 1408 to scan the light beam 1404 through a succession of directions "A" through "G" (FIG. 14A), while causing the pulsed light source 800 to vary the light pulse energy from pulse to pulse and, accordingly, the brightness of the pulsed light source 800 from pulse to pulse to raster an image to be displayed, i.e. forming an image in angular domain. A feedback circuit may be provided to indicate the current scanner 1408 position to the display controller 1412. The pupil replicator 1410 provides multiple laterally displaced parallel copies of the scanned light beam 1404 in directions "A" through "G", as illustrated. A viewer's eye 1414 receives the light field 1415, and forms an image at the eye's retina 1416 from the corresponding replicated light beams. A linear position of the beam copies on the eye's retina 1416 is denoted in FIG. 14A with letters "a" through "g", and corresponds to the directions "A" through "G" of the scanned light beam 1404. In this manner, the eye 1414 forms a linear image on the eye's retina 1416 from the image in the angular domain formed by the light field 1415.

Referring specifically to FIG. 14B, the display controller 1412 may be configured for operating the pulsed light source 800 for providing the driving pulses 327 to the diode light source 102, such that a pulsewidth of the driving pulses 327 is less than a time interval during which the scanner 1408 of the scanning projector display 1400 is directing the light beam 1404 through the angular range $\Delta\alpha$ corresponding to one pixel, e.g. a current pixel 1484 of the image being displayed. Pixels 1486, including the currently displayed pixel 1484, are shown in FIG. 14B in an arc configuration, to illustrate that the image being generated is in angular domain where each beam angle corresponds to a pixel of the image. The energy of the driving pulses 327 may be selected in accordance with the current pixel 1484 (or pixels) being displayed at any given moment of time.

Figure 15A:
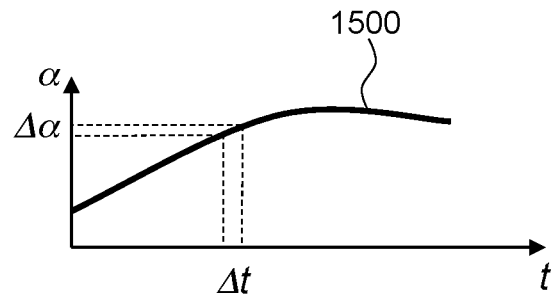
FIG. 15A is a graph of a scanner's pointing angle vs. time.
Figure 15B:
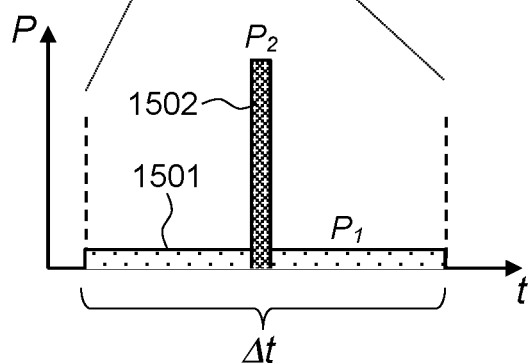
FIG. 15B is a graph of the LED output power vs. time during scanning across the pixel of FIG. 14B.

FIGS. 15A and 15B illustrate the timing of the driving pulses 327. A scanning angle $\alpha$ of the scanner 1408 runs through the angular range $\Delta\alpha$ during a time interval $\Delta t$. The time dependence of the scanning angle a is shown at 1500. In some embodiments, the time duration of driving pulses 327 is shorter than $\Delta t$, and may be much shorter, e.g. less than one tenth of $\Delta t$, one hundredth of $\Delta t$, and even less than one thousandth of $\Delta t$.

In some embodiments, a pulse energy of a light pulse provided by the diode light source 102 when driven by the current pulse 327 is approximately (e.g. to within 10-20%) equal to a nominal energy of the light beam when the diode light source 102 is driven at a constant driving current during the pixel time interval. For example, referring specifically to FIG. 15B with further reference to FIG. 14B, a nominal energy of the light beam 1404 accumulated during the time interval $\Delta t$ is $\Delta t*P_1$, where $P_1$ is a nominal optical power level, at which the light source 102, e.g. a SLED, would be normally operated if the diode light source 102 were to be powered at the power level $P_1$ throughput the entire time interval $\Delta t$. The light energy emitted during the time interval $\Delta t$ can be represented by a horizontal rectangle 1501. Since the time duration of the powering pulse represented by a vertical rectangle 1502 is shorter than $\Delta t$, the optical power level $P_2$ of the driving pulses 327 can be proportionally higher, such that the light energy is about the same as $\Delta t*P_1$. In other words, approximately the same number of photons is emitted in the driving pulses 327 but during much shorter time interval than $\Delta t$. The latter condition may be expressed as $$\int_{\Delta t} P(t)dt = P_1 \cdot \Delta t \quad (1)$$

In some embodiments, the pulse energy of the light pulse is lower than a threshold energy equal to the pixel time interval multiplied by some threshold optical power of the light source 102. For SLED power sources, the threshold optical power of the SLED may be represented by a lasing threshold optical power of the SLED. The threshold energy may also need to be below a laser safety threshold, i.e. below a safe light energy to be directed to the viewer's eye 1414. By way of non-limiting examples, wherein the pulsewidth may be less than 10 nanoseconds, and even shorter, less than 5 nanoseconds. In some embodiments, the pulsed light source 800 and/or the display driver 1412 may be configured to provide the driving pulse 327 in a middle of the pixel time interval during which the scanner 1408 of the projector display 1400 is directed to a corresponding pixel of the image. For example, in FIG. 15B, the short powering pulse represented by the vertical rectangle 1502 is disposed in the middle of the time interval Dt.

Figure 16:
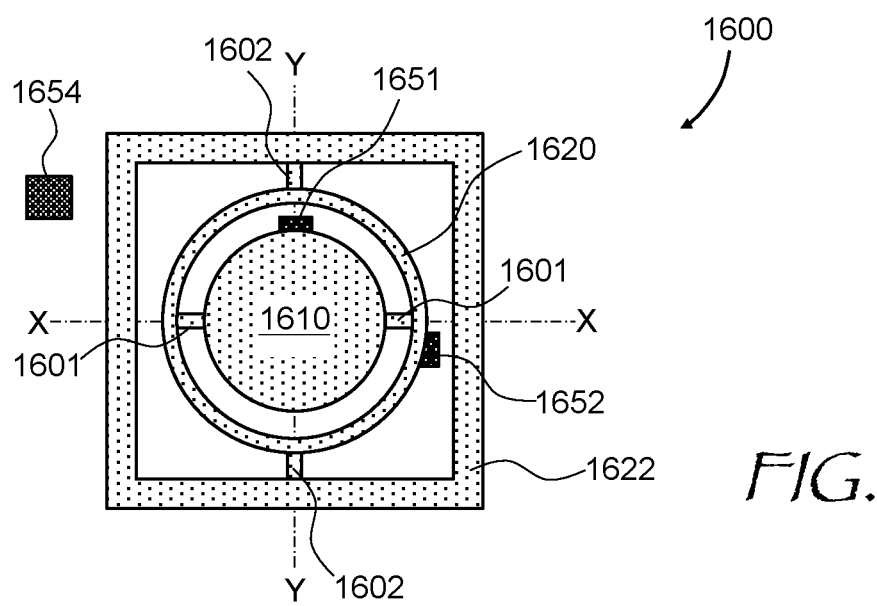
FIG. 16 is a plan view of a 2D scanning microelectromechanical system (MEMS) mirror.

Referring to FIG. 16, a two-dimensional (2D) tiltable microelectromechanical system (MEMS) scanner 1600 includes a reflector 1610 supported by a pair of first torsional hinges 1601 allowing tilting the reflector 1610 about X axis. The first torsional hinges 1601 extend from the reflector 1610 to a gimbal ring 1620, which is supported by a pair of second torsional hinges 1602 extending from the gimbal ring 1620 to a fixed base 1622, for tilting of the gimbal ring 1620 and the reflector 1610 about Y axis. Actuators may be disposed underneath the reflector 1610 and/or the gimbal ring 1620 for providing a force for actuating the tilt of the reflector 1610 about X and Y axes. The actuators may be electrostatic, electro-magnetic, piezo-electric, etc. For electrostatic mirror actuation, the comb drive may be located on the torsional hinge members. For example, in the embodiment shown in FIG. 16, a first actuator 1651 may be disposed under an edge of the reflector 1610 to tilt the reflector 1610 about X-axis. A second actuator 1652 may be disposed under the gimbal ring 1620 for tilting the gimbal ring 1620 and the reflector 1610 about Y-axis. It is noted that reflector 1610 may be offset from a center of a corresponding substrate, if needed.

A feedback circuit 1654 may be provided for determining the X- and Y-angles of tilt of the reflector 1610. The feedback circuit 1654 may measure electric capacitance between the first electrostatic actuator 1651 and the reflector 1610 to determine the X-tilt, and electric capacitance between the second electrostatic actuator 1652 and the gimbal ring 1620 to determine the Y-tilt. Separate electrodes may also be provided specifically for the feedback circuit 1654. In some embodiments, the feedback circuit 1654 may provide a sync or triggering pulses when the reflector 1610 is tilted at a certain X- and/or Y-angle.

Figure 17:
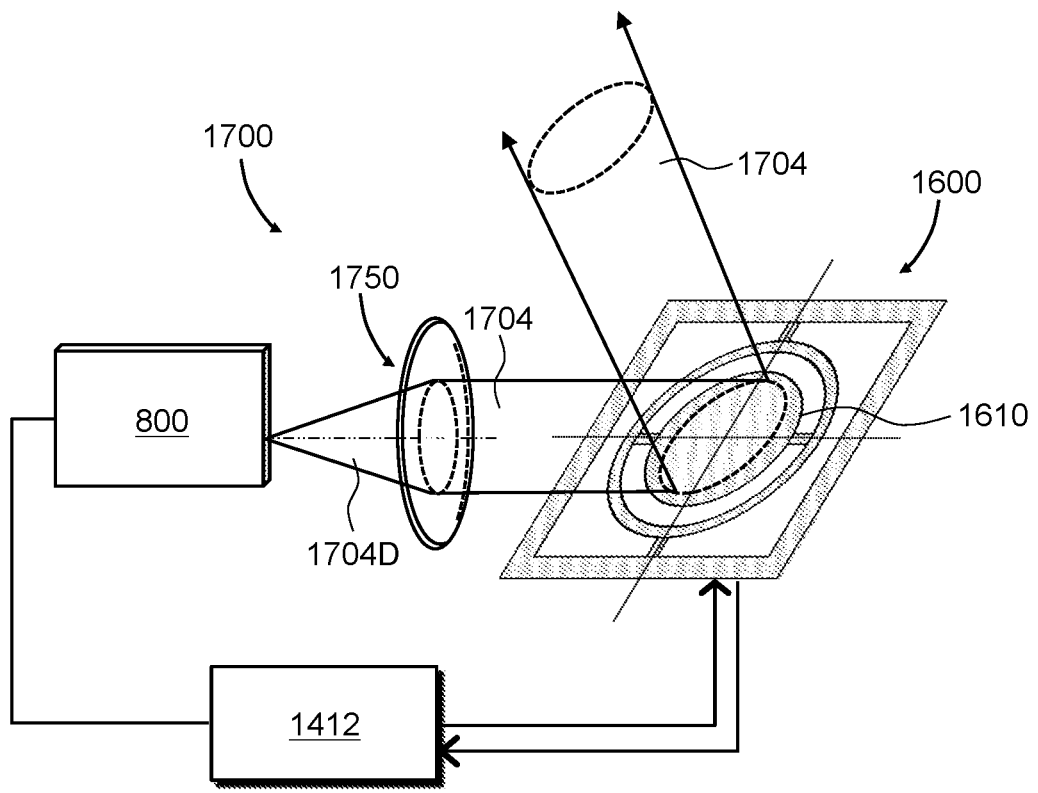
FIG. 17 is a schematic view of a 2D MEMS scanning system using the MEMS mirror of FIG. 16 and a superluminescent LED (SLED) as a light source.

Turning to FIG. 17, a projector display 1700 includes the pulsed light source 800 including e.g. a SLED or a SLED array for providing a diverging optical beam 1304D, a collimator 1750 optically coupled to the pulsed light source 800, and the MEMS scanner 1600 of FIG. 16 optically coupled to the collimator 1750. The controller 1412 can be operably coupled to the pulsed light source 800 and the MEMS scanner 1600.

The collimator 1750, e.g. a lens, is optically coupled to the pulsed light source 800 for collimating a diverging optical beam 1704D to obtain a collimated optical beam 1704. Any optical component having optical power, i.e. focusing or collimating power, such as a concave mirror, a diffractive lens, a folded-beam freeform optical element, etc., may be used in the collimator 1750. The reflector 1610 of the MEMS scanner 1600 is optically coupled to the collimator 1750 for receiving and redirecting the collimated optical beam 1704.

The controller 1412 may be configured to provide control signals to the pulsed light source 800 in coordination with tilting the reflector 1610 to provide an image in angular domain. When viewed by a human eye, the image in angular domain is projected by the eye's cornea and lens to become a spatial-domain image on the eye's retina, as explained above with reference to FIG. 14A.

In some embodiments, the MEMS scanner 1600 may include a 1D scanning mirror. For this embodiment, a linear array of light sources may be used to provide a plurality of image pixels in a direction perpendicular to the direction of scanning. In some embodiments, the MEMS scanner 1600 may include two 1D scanning mirrors, one for scanning about X axis, and the other for scanning about Y axis. The two 1D tiltable mirrors may be optically coupled e.g. via a pupil relay.

Figure 18:
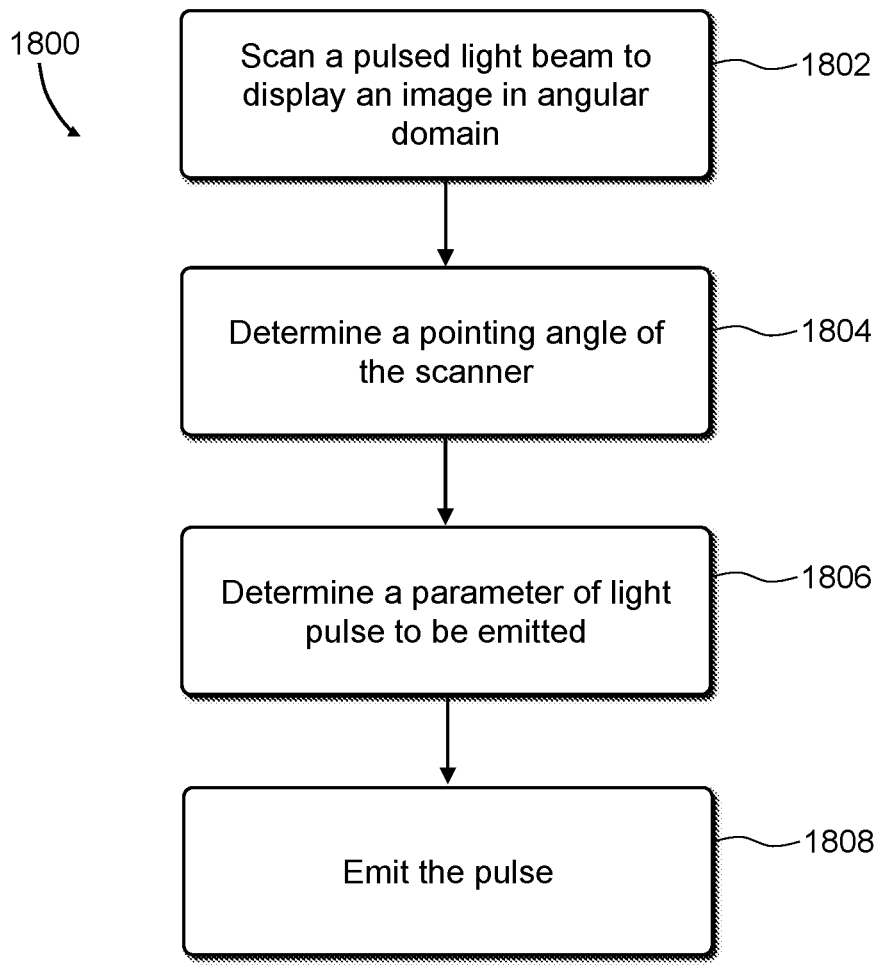
FIG. 18 is a flow chart of a method of operating a scanning projection display.

Referring to FIG. 18 with further reference to FIG. 17, a method 1800 for displaying an image includes using a scanner to angularly scan (1802) a light beam (e.g. the light beam 1704) for displaying an image, the light beam 1704 comprising a succession of light pulses e.g. the light pulses emitted by the diode light source 102 when powered by the driving pulses 327 (FIGS. 1, 2, and 10B) and/or light pulses emitted by the diode light source D1 when powered by the driving current pulses I(D1) as illustrated in FIGS. 11 and 12B. A pointing angle of the scanner may be determined (1804) e.g. from the driving signal, from a mirror position sensor reporting a current tilt angle of the reflector 1610, or from both the driving signal and the mirror position sensor (FIGS. 16, 17). A parameter of the light pulse to be emitted is determined (1806), e.g. the pulse energy, the pulse amplitude, the pulse duration, or the color (for color light sources), etc. Then, a light source such as an LED, an SLED, a laser diode, etc., is energized by providing a powering electric pulse (e.g. the driving pulse 327) to the diode light source. The powering pulse has an amplitude and/or a duration corresponding to the amplitude and/or duration of the light pulse to be emitted. As explained above with reference to FIG. 15B, the duration of the powering pulse may be less than the pixel time interval At during which the scanner 1408 of the projector display 1400 is directing the light beam to a pixel (e.g. the currently displayed pixel 1484 in FIG. 14B) of the image. The pulse may then be emitted (1808).

Figure 19A:
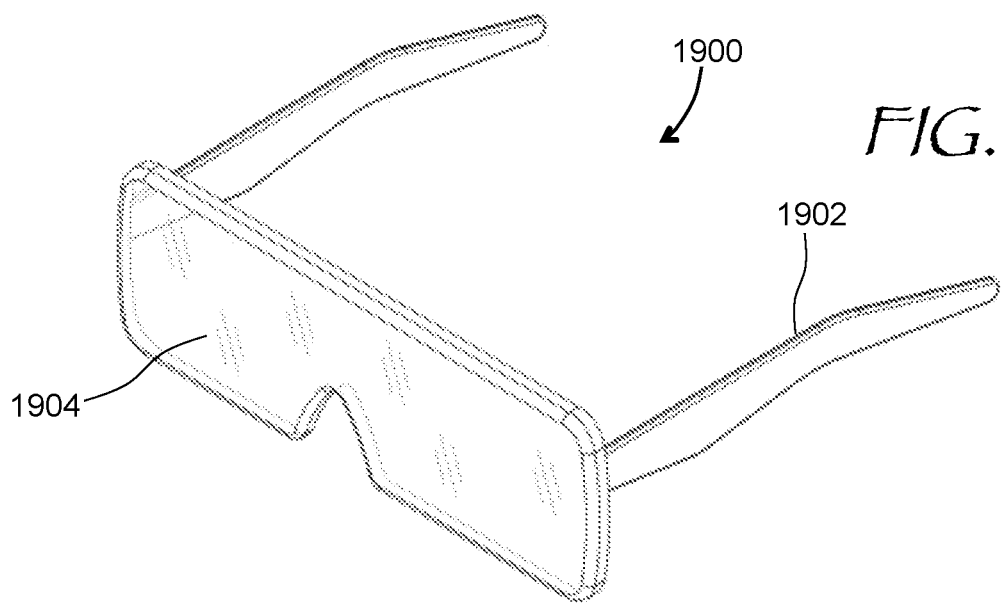
FIG. 19A is an isometric view of an eyeglasses form factor near-eye AR/VR display incorporating a pulsed light source of the present disclosure.
Figure 19B:
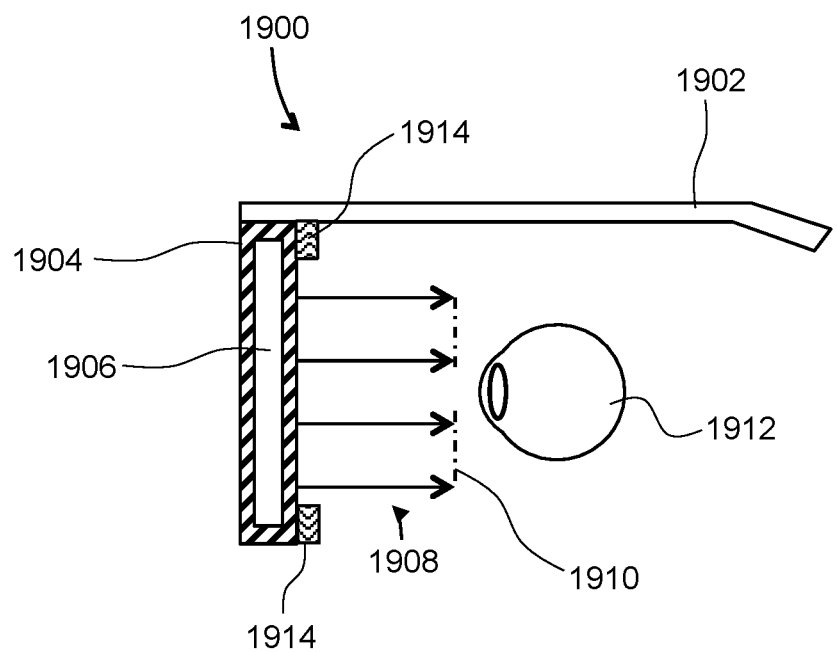
FIG. 19B is a side cross-sectional view of the display of FIG. 19A.

Referring to FIGS. 19A and 19B, a near-eye AR/VR display 1900 may include any of the pulsed drivers, light sources, or scanning displays described herein. A body or frame 1902 of the near-eye AR/VR display 1900 has a form factor of a pair of eyeglasses. A display 1904 includes a display assembly 1906 (FIG. 19B), which provides display light 1908 to an eyebox 1910, i.e. a geometrical area where a good-quality image may be presented to a user's eye 1912. The display assembly 1906 may include a separate display module for each eye, or one display module for both eyes in a light sharing configuration.

The near-eye AR/VR display 1900 may also include an eye-tracking system 1914 for determining, in real time, the gaze direction and/or the vergence angle of the user's eyes 1912. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Yet furthermore, the near-eye coherent AR/VR display 1900 may include an audio system, such as small speakers or headphones.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 20A:
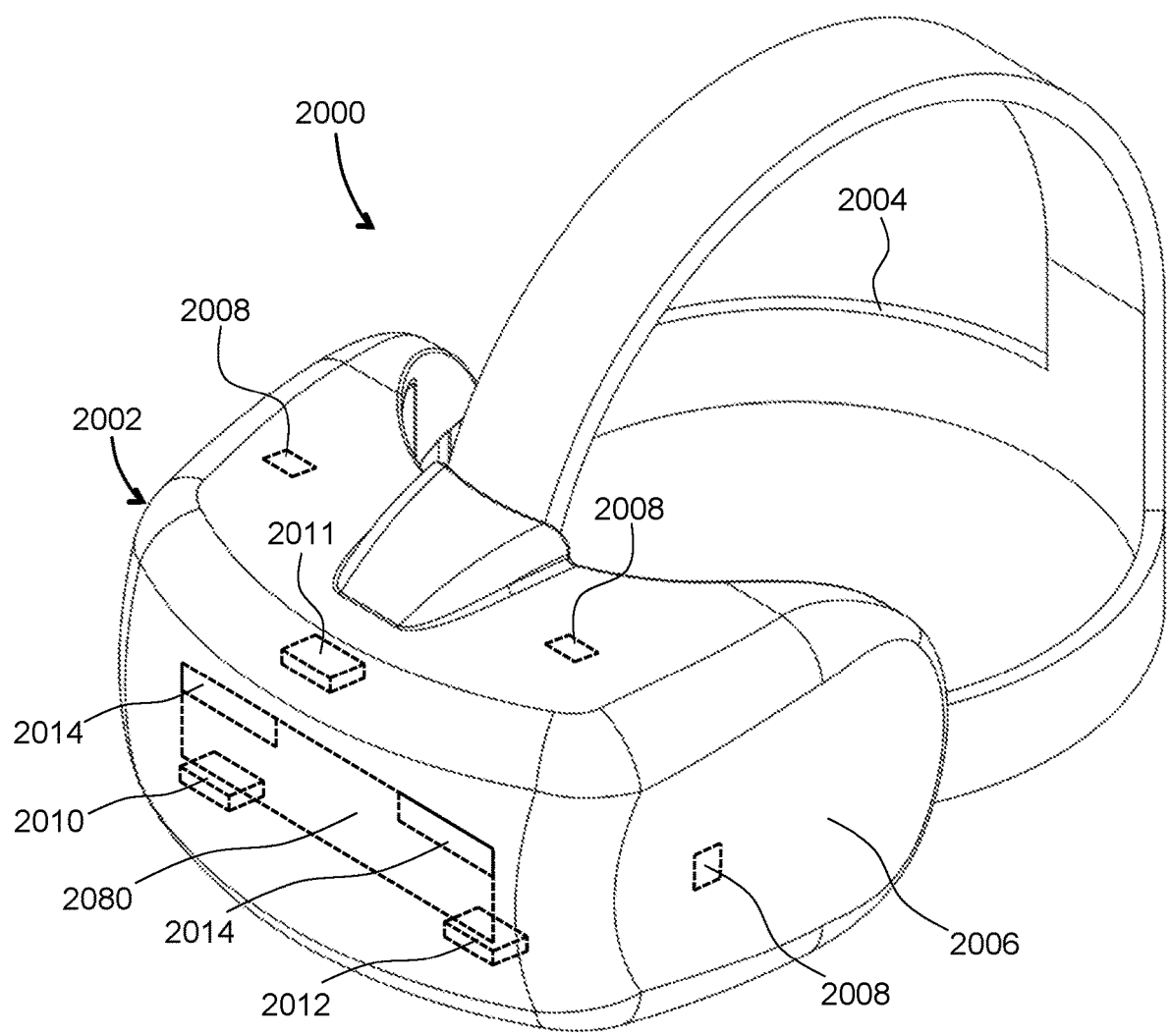
FIG. 20A is an isometric view of a head-mounted display headset incorporating a pulsed light source of the present disclosure.

Referring to FIG. 20A, an HMD 2000 is an example of an AR/VR wearable display system which encloses the user's face, for a greater degree of immersion into the AR/VR environment. The HMD 2000 may include any of the drivers, light sources, or displays described herein. The function of the HMD 2000 is to augment views of a physical, real-world environment with computer-generated imagery, and/or to generate the entirely virtual 3D imagery. The HMD 2000 may include a front body 2002 and a band 2004. The front body 2002 is configured for placement in front of eyes of a user in a reliable and comfortable manner, and the band 2004 may be stretched to secure the front body 2002 on the user's head. A display system 2080 may be disposed in the front body 2002 for presenting AR/VR imagery to the user. Sides 2006 of the front body 2002 may be opaque or transparent.

In some embodiments, the front body 2002 includes locators 2008 and an inertial measurement unit (IMU) 2010 for tracking acceleration of the HMD 2000, and position sensors 2012 for tracking position of the HMD 2000. The IMU 2010 is an electronic device that generates data indicating a position of the HMD 2000 based on measurement signals received from one or more of position sensors 2012, which generate one or more measurement signals in response to motion of the HMD 2000. Examples of position sensors 2012 include: one or more accelerometers, one or more gyroscopes, one or more magnetometers, another suitable type of sensor that detects motion, a type of sensor used for error correction of the IMU 2010, or some combination thereof. The position sensors 2012 may be located external to the IMU 2010, internal to the IMU 2010, or some combination thereof.

The locators 2008 are traced by an external imaging device of a virtual reality system, such that the virtual reality system can track the location and orientation of the entire HMD 2000. Information generated by the IMU 2010 and the position sensors 2012 may be compared with the position and orientation obtained by tracking the locators 2008, for improved tracking accuracy of position and orientation of the HMD 2000. Accurate position and orientation is important for presenting appropriate virtual scenery to the user as the latter moves and turns in 3D space.

The HMD 2000 may further include a depth camera assembly (DCA) 2011, which captures data describing depth information of a local area surrounding some or all of the HMD 2000. To that end, the DCA 2011 may include a laser radar (LIDAR), or a similar device. The depth information may be compared with the information from the IMU 2010, for better accuracy of determination of position and orientation of the HMD 2000 in 3D space.

The HMD 2000 may further include an eye tracking system 2014 for determining orientation and position of user's eyes in real time. The obtained position and orientation of the eyes also allows the HMD 2000 to determine the gaze direction of the user and to adjust the image generated by the display system 2080 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 2002.

Figure 20B:
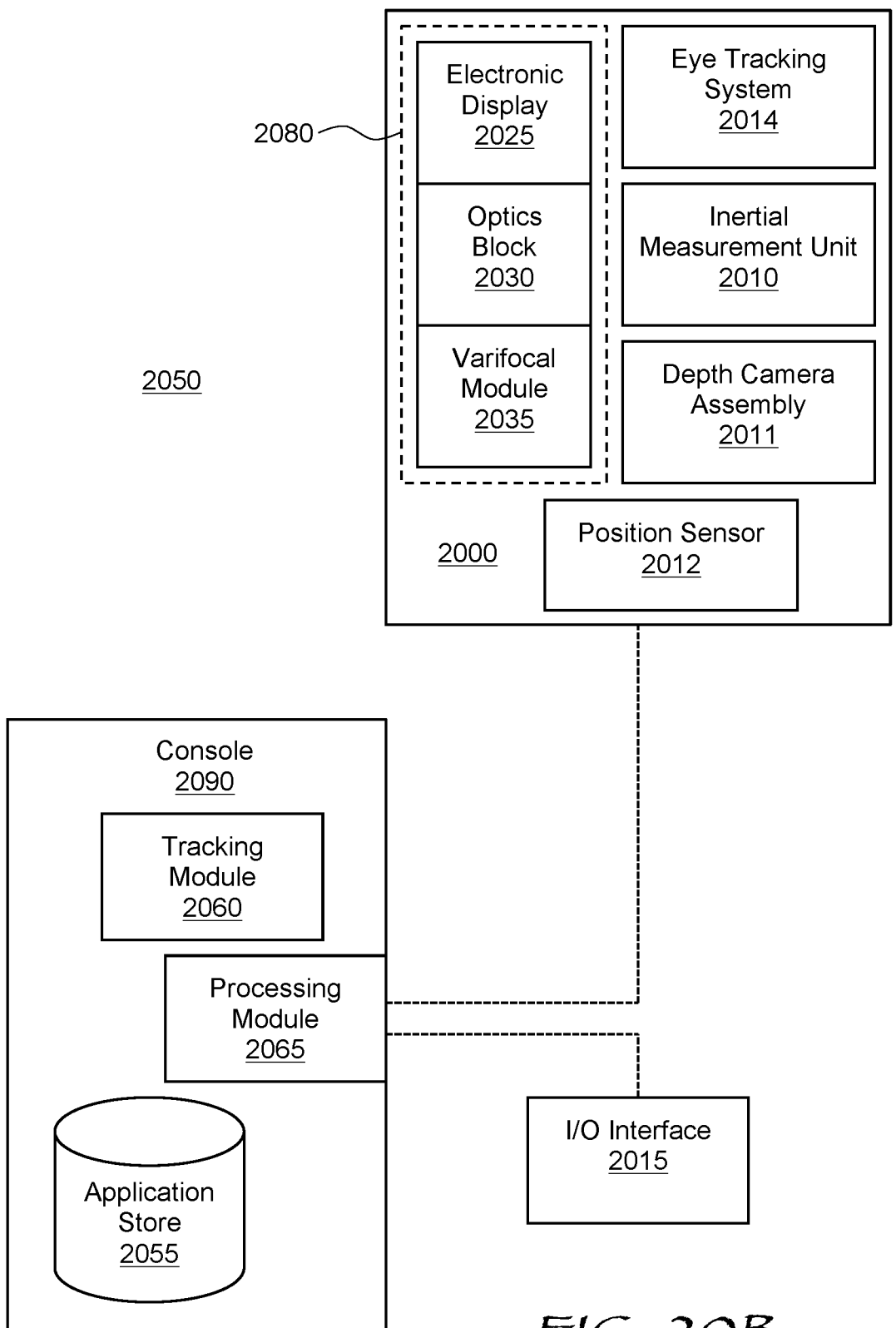
FIG. 20B is a block diagram of a virtual reality system including the headset of FIG. 20A.

Referring to FIG. 20B, an AR/VR system 2050 includes the HMD 2000 of FIG. 20A, an external console 2090 storing various AR/VR applications, setup and calibration procedures, 3D videos, etc., and an input/output (I/O) interface 2015 for operating the console 2090 and/or interacting with the AR/VR environment. The HMD 2000 may be "tethered" to the console 2090 with a physical cable, or connected to the console 2090 via a wireless communication link such as Bluetooth®, Wi-Fi, etc. There may be multiple HMDs 2000, each having an associated I/O interface 2015, with each HMD 2000 and I/O interface(s) 2015 communicating with the console 2090. In alternative configurations, different and/or additional components may be included in the AR/VR system 2050. Additionally, functionality described in conjunction with one or more of the components shown in FIGS. 20A and 20B may be distributed among the components in a different manner than described in conjunction with FIGS. 20A and 20B in some embodiments. For example, some or all of the functionality of the console 2015 may be provided by the HMD 2000, and vice versa. The HMD 2000 may be provided with a processing module capable of achieving such functionality.

As described above with reference to FIG. 20A, the HMD 2000 may include the eye tracking system 2014 (FIG. 20B) for tracking eye position and orientation, determining gaze angle and convergence angle, etc., the IMU 2010 for determining position and orientation of the HMD 2000 in 3D space, the DCA 2011 for capturing the outside environment, the position sensor 2012 for independently determining the position of the HMD 2000, and the display system 2080 for displaying AR/VR content to the user. The display system 2080 includes (FIG. 20B) an electronic display 2025, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 2080 further includes an optics block 2030, whose function is to convey the images generated by the electronic display 2025 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 2080 may further include a varifocal module 2035, which may be a part of the optics block 2030. The function of the varifocal module 2035 is to adjust the focus of the optics block 2030 e.g. to compensate for vergence-accommodation conflict, to correct for vision defects of a particular user, to offset aberrations of the optics block 2030, etc.

The I/O interface 2015 is a device that allows a user to send action requests and receive responses from the console 2090. An action request is a request to perform a particular action. For example, an action request may be an instruction to start or end capture of image or video data or an instruction to perform a particular action within an application. The I/O interface 2015 may include one or more input devices, such as a keyboard, a mouse, a game controller, or any other suitable device for receiving action requests and communicating the action requests to the console 2090. An action request received by the I/O interface 2015 is communicated to the console 2090, which performs an action corresponding to the action request. In some embodiments, the I/O interface 2015 includes an IMU that captures calibration data indicating an estimated position of the I/O interface 2015 relative to an initial position of the I/O interface 2015. In some embodiments, the I/O interface 2015 may provide haptic feedback to the user in accordance with instructions received from the console 2090. For example, haptic feedback can be provided when an action request is received, or the console 2090 communicates instructions to the I/O interface 2015 causing the I/O interface 2015 to generate haptic feedback when the console 2090 performs an action.

The console 2090 may provide content to the HMD 2000 for processing in accordance with information received from one or more of: the IMU 2010, the DCA 2011, the eye tracking system 2014, and the I/O interface 2015. In the example shown in FIG. 20B, the console 2090 includes an application store 2055, a tracking module 2060, and a processing module 2065. Some embodiments of the console 2090 may have different modules or components than those described in conjunction with FIG. 20B. Similarly, the functions further described below may be distributed among components of the console 2090 in a different manner than described in conjunction with FIGS. 20A and 20B.

The application store 2055 may store one or more applications for execution by the console 2090. An application is a group of instructions that, when executed by a processor, generates content for presentation to the user. Content generated by an application may be in response to inputs received from the user via movement of the HMD 2000 or the I/O interface 2015. Examples of applications include: gaming applications, presentation and conferencing applications, video playback applications, or other suitable applications.

The tracking module 2060 may calibrate the AR/VR system 2050 using one or more calibration parameters and may adjust one or more calibration parameters to reduce error in determination of the position of the HMD 2000 or the I/O interface 2015. Calibration performed by the tracking module 2060 also accounts for information received from the IMU 2010 in the HMD 2000 and/or an IMU included in the I/O interface 2015, if any. Additionally, if tracking of the HMD 2000 is lost, the tracking module 2060 may re-calibrate some or all of the AR/VR system 2050.

The tracking module 2060 may track movements of the HMD 2000 or of the I/O interface 2015, the IMU 2010, or some combination thereof. For example, the tracking module 2060 may determine a position of a reference point of the HMD 2000 in a mapping of a local area based on information from the HMD 2000. The tracking module 2060 may also determine positions of the reference point of the HMD 2000 or a reference point of the I/O interface 2015 using data indicating a position of the HMD 2000 from the IMU 2010 or using data indicating a position of the I/O interface 2015 from an IMU included in the I/O interface 2015, respectively. Furthermore, in some embodiments, the tracking module 2060 may use portions of data indicating a position or the HMD 2000 from the IMU 2010 as well as representations of the local area from the DCA 2011 to predict a future location of the HMD 2000. The tracking module 2060 provides the estimated or predicted future position of the HMD 2000 or the I/O interface 2015 to the processing module 2065.

The processing module 2065 may generate a 3D mapping of the area surrounding some or all of the HMD 2000 ("local area") based on information received from the HMD 2000. In some embodiments, the processing module 2065 determines depth information for the 3D mapping of the local area based on information received from the DCA 2011 that is relevant for techniques used in computing depth. In various embodiments, the processing module 2065 may use the depth information to update a model of the local area and generate content based in part on the updated model.

The processing module 2065 executes applications within the AR/VR system 2050 and receives position information, acceleration information, velocity information, predicted future positions, or some combination thereof, of the HMD 2000 from the tracking module 2060. Based on the received information, the processing module 2065 determines content to provide to the HMD 2000 for presentation to the user. For example, if the received information indicates that the user has looked to the left, the processing module 2065 generates content for the HMD 2000 that mirrors the user's movement in a virtual environment or in an environment augmenting the local area with additional content. Additionally, the processing module 2065 performs an action within an application executing on the console 2090 in response to an action request received from the I/O interface 2015 and provides feedback to the user that the action was performed. The provided feedback may be visual or audible feedback via the HMD 2000 or haptic feedback via the I/O interface 2015.

In some embodiments, based on the eye tracking information (e.g., orientation of the user's eyes) received from the eye tracking system 2014, the processing module 2065 determines resolution of the content provided to the HMD 2000 for presentation to the user on the electronic display 2025. The processing module 2065 may provide the content to the HMD 2000 having a maximum pixel resolution on the electronic display 2025 in a foveal region of the user's gaze. The processing module 2065 may provide a lower pixel resolution in other regions of the electronic display 2025, thus lessening power consumption of the AR/VR system 2050 and saving computing resources of the console 2090 without compromising a visual experience of the user. In some embodiments, the processing module 2065 can further use the eye tracking information to adjust where objects are displayed on the electronic display 2025 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A pulsed driver for a diode light source, the pulsed driver comprising:
    a first powering terminal for coupling to one of p- and n-terminals of the diode light source;
    a second powering terminal for coupling to the other one of the p- and n- terminals of the diode light source;
    a powering circuit comprising a power source and an inductor sequentially coupled to the power source, wherein the power source is coupled to the first powering terminal, and the inductor is coupled to the second powering terminal;
    an on/off switch coupled to the first and second powering terminals for shunting the diode light source when the on/off switch is in a closed state; and
    a control circuit configured to keep the on/off switch in the closed state for charging the inductor before switching to an open state.

2. The pulsed driver of claim 1, wherein a voltage provided by the power source is lower than a threshold voltage of the diode light source for emitting light.

3. The pulsed driver of claim 1, wherein the powering circuit lacks a catch diode.

4. The pulsed driver of claim 1, wherein the pulsed driver lacks a capacitive energy store coupled to the first and second powering terminals.

5. The pulsed driver of claim 1, wherein the control circuit comprises a programmable delay line configured to receive a first clock signal and to provide a second clock signal delayed relative to the first clock signal by a controllable amount, for keeping the on/off switch in the closed state for a configurable amount of time for charging the inductor by a configurable amount.

6. The pulsed driver of claim 5, wherein the control circuit further comprises a logic gate comprising first and second input terminals and an output terminal, wherein the first input terminal is configured to receive the first clock signal, the second input terminal is configured to receive the second clock signal, and wherein the output terminal is operably coupled to the on/off switch for controlling the on/off switch.

7. The pulsed driver of claim 6, wherein the logic gate comprises a pair of inverters coupled by a wired AND connection.

8. The pulsed driver of claim 6, wherein the control circuit further comprises a level shifter for shifting a level of at least one of the first or second clock signal for coupling to the logic gate.

9. A pulsed light source comprising:
    a diode light source comprising p- and n-terminals;
    a powering circuit comprising a power source and an inductor sequentially coupled to the power source, wherein the power source is coupled to one of the p- and n-terminals, and the inductor is coupled to the other one of the p- and n-terminals;
    an on/off switch coupled to the p- and n-terminals for shunting the diode light source when the on/off switch is in a closed state; and
    a control circuit configured to keep the on/off switch in the closed state for charging the inductor before switching to an open state.

10. The pulsed light source of claim 9 wherein, when the on/off switch is opened after the inductor has been charged, a pulsed electrical current flows through the diode light source, causing the diode light source to emit a light pulse having an energy dependent on an amount of time the on/off switch has been in the closed state before opening the on/off switch.

11. The pulsed light source of claim 10, wherein the diode light source comprises a laser diode.

12. The pulsed light source of claim 11, wherein the laser diode comprises a side-emitting laser diode.

13. The pulsed light source of claim 11, wherein the laser diode comprises a vertical cavity surface-emitting laser diode.

14. The pulsed light source of claim 11, wherein in operation, a voltage provided by the power source is lower than a threshold voltage of the laser diode.

15. The pulsed light source of claim 9, wherein the powering circuit lacks at least one of: a catch diode; or a capacitive energy store coupled to the p- and n-terminals.

16. A display comprising:
    a pulsed light source for providing a light beam including a light pulse, the pulsed light source comprising:
        a diode light source comprising p- and n-terminals;
        a powering circuit comprising a power source and an inductor sequentially coupled to the power source, wherein the power source is coupled to one of the p- and n-terminals, and the inductor is coupled to the other one of the p- and n-terminals;
        an on/off switch coupled to the p- and n-terminals for shunting the diode light source when the on/off switch is in a closed state; and
        a control circuit configured to keep the on/off switch in the closed state for charging the inductor before switching to an open state; and
    a scanner optically coupled to the pulsed light source for angularly scanning the light beam.

17. The display of claim 16 wherein, when the on/off switch is opened after the inductor has been charged, a pulsed electrical current flows through the diode light source, causing the diode light source to emit the light pulse, wherein the light pulse has an energy dependent on an amount of time the on/off switch has been in the closed state before opening the on/off switch.

18. The display of claim 17, wherein the diode light source comprises a laser diode, wherein a voltage provided by the power source is lower than a threshold voltage of the diode light source for emitting light.

19. The display of claim 16, further comprising a display controller operably coupled to the pulsed light source and the scanner and configured to scan the light beam through a succession of directions while causing the pulsed light source to vary pulse energy from pulse to pulse.

20. The display of claim 19, wherein the display controller is configured to:
- use the scanner to scan the light beam;
- determine a pointing angle of the scanner;
- determine an energy of a light pulse to be emitted in accordance with the determined pointing angle of the scanner; and
- cause the diode light source to emit the light pulse having the determined energy.

* * * * *